United States Patent
Aoki

(10) Patent No.: US 10,576,605 B2
(45) Date of Patent: Mar. 3, 2020

(54) POWER TOOL

(71) Applicant: MAKITA CORPORATION, Anjo-shi, Aichi (JP)

(72) Inventor: Yonosuke Aoki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/298,033

(22) Filed: Mar. 11, 2019

(65) Prior Publication Data

US 2019/0202026 A1 Jul. 4, 2019

Related U.S. Application Data

(62) Division of application No. 15/237,093, filed on Aug. 15, 2016, now Pat. No. 10,286,519.

(30) Foreign Application Priority Data

Aug. 18, 2015 (JP) .................................. 2015-161420
Aug. 18, 2015 (JP) .................................. 2015-161421

(51) Int. Cl.
*B24B 45/00* (2006.01)
*B27B 19/00* (2006.01)
(Continued)

(52) U.S. Cl.
CPC ............ *B24B 45/006* (2013.01); *B23B 31/10* (2013.01); *B24B 23/022* (2013.01); *B25F 5/00* (2013.01);
(Continued)

(58) Field of Classification Search
CPC ... B24B 45/006; B24B 23/022; B27B 19/006; B27B 5/32; B25F 5/00; B23D 51/10
(Continued)

(56) References Cited

U.S. PATENT DOCUMENTS 4,844,489 A * 7/1989 Acker, III ........... B23B 31/1223
279/4.06
5,175,963 A 1/1993 Schafer et al.
(Continued)

FOREIGN PATENT DOCUMENTS

DE 11 2013 000 831 T5 10/2014
EP 0 829 237 A2 3/1998
(Continued)

OTHER PUBLICATIONS

Dec. 19, 2016 Extended European Search Report issued in European Patent Application No. 16184506.0.
(Continued)

*Primary Examiner* — Eric A. Gates
*Assistant Examiner* — Paul M Janeski
(74) *Attorney, Agent, or Firm* — Oliff PLC

(57) ABSTRACT

It is an object of the invention to increase the degree of freedom in designing a power tool. A representative power tool has a spindle that transmits a driving force of a motor to a tool accessory, a tool accessory holding member that is configured to be movable in a direction of a spindle rotation axis direction between a holding position for holding the tool accessory and a releasing position for releasing the tool accessory, a lock mechanism that locks the tool accessory holding member in the holding position, and a body housing. The lock mechanism is disposed between a second end of the spindle and a wall of the body housing in the spindle rotation axis direction.

20 Claims, 10 Drawing Sheets

(51) Int. Cl.
  *B27B 5/32* (2006.01)
  *B23B 31/10* (2006.01)
  *B25F 5/00* (2006.01)
  *B24B 23/02* (2006.01)
  *B23D 51/10* (2006.01)

(52) U.S. Cl.
  CPC .............. *B27B 5/32* (2013.01); *B27B 19/006* (2013.01); *B23D 51/10* (2013.01); *Y10T 279/33* (2015.01)

(58) Field of Classification Search
  USPC .................................................. 451/357, 356
  See application file for complete search history.

(56) References Cited

U.S. PATENT DOCUMENTS

| | | | |
|---|---|---|---|
| 7,344,435 B2 | 3/2008 | Pollak et al. | |
| 8,187,058 B2 * | 5/2012 | Blickle | B24B 45/006 451/342 |
| 2007/0060030 A1 | 3/2007 | Pollak et al. | |
| 2013/0082449 A1 | 4/2013 | Bernardi et al. | |
| 2015/0042052 A1 | 2/2015 | Furusawa et al. | |
| 2015/0084552 A1 | 3/2015 | Feldman et al. | |

FOREIGN PATENT DOCUMENTS

| | | |
|---|---|---|
| EP | 1 737 616 A1 | 1/2007 |
| EP | 3 050 678 A2 | 8/2016 |
| JP | 4-781 U | 1/1992 |
| JP | H09-277156 A | 10/1997 |
| JP | 2007-533472 A | 11/2007 |
| JP | S49-57990 B2 | 6/2012 |
| JP | 2013-158879 A | 8/2013 |

OTHER PUBLICATIONS

Oct. 24, 2017 Office Action Issued in U.S. Appl. No. 15/237,093.
Jun. 4, 2018 Office Action Issued in U.S. Appl. No. 15/237,093.
Nov. 7, 2018 Extended European Search Report issued in European Patent Application No. 18179121.1.
Dec. 18, 2018 Office Action issued in Japanese Patent Application No. 2015-161420.
Jan. 30, 2019 Office Action issued in Japanese Patent Application No. 2015-161421.

* cited by examiner

POWER TOOL

This is a Divisional of application Ser. No. 15/237,093, filed Aug. 15, 2016, which claims priority to Japanese Patent Application Nos. 2015-161420 and 2015-161421, both filed Aug. 18, 2015. The disclosures of the prior applications are hereby incorporated by reference herein in their entirety.

TECHNICAL FIELD

The present invention relates to a power tool which performs a prescribed operation on a workpiece by driving a tool accessory.

BACKGROUND ART

EP 1,737,616 A1 discloses a hand-held power tool which transmits a driving force of a driving motor to a spindle to drive a tool accessory. In this power tool, a clamp shaft extends through the spindle and holds the tool accessory. The clamp shaft is configured to be movable between a holding position for holding the tool accessory and a releasing position for releasing the tool accessory and to engage in the holding position with a lock mechanism provided inside the spindle.

SUMMARY OF THE INVENTION

Problems to be Solved by the Invention

In the above-described power tool, the clamp shaft is locked by the lock mechanism and holds the tool accessory, so that a user can perform a prescribed operation with stability. Further, the user can easily replace the tool accessory by placing the clamp shaft in the releasing position.

In this power tool, however, due to the arrangement of the lock mechanism within the spindle, the degree of freedom in designing the spindle and the lock mechanism is limited. Therefore, further improvement is desired in the member arrangement for designing a desired power tool.

Accordingly, it is an object of the present invention to provide a more rational technique for increasing the degree of freedom in designing a power tool.

In order to solve the above-described problem, according to the present invention, a power tool is provided which performs a prescribed operation on a workpiece by driving a tool accessory. The power tool has a motor, a spindle, a tool accessory holding member, a lock mechanism and a body housing.

The spindle is configured to transmit a driving force of the motor to the tool accessory. The spindle has a hollow shape and has a first end and a second end in a spindle rotation axis direction.

The tool accessory holding member is configured to be movable in the spindle rotation axis direction between a holding position for holding the tool accessory and a releasing position for releasing the tool accessory. The tool accessory holding member has a spindle inner region which is disposed inside the spindle, a tool accessory fastening region which protrudes from the first end of the spindle and can be fastened to the tool accessory, and an engagement region which protrudes from the second end of the spindle and can be engaged with the lock mechanism.

The lock mechanism is configured to engage with the tool accessory holding member in the holding position and lock the tool accessory holding member.

The body housing forms at least part of an outer shell of the power tool.

In the power tool having the above-described structure, the lock mechanism is disposed between the second end of the spindle and a wall of the body housing in the spindle rotation axis direction.

With the above-described structure, in the power tool of the present invention, the lock mechanism and the spindle are arranged apart from each other. Thus, the spindle can be independently designed without depending on the design of the lock mechanism, so that, for example, the spindle can be reduced in size.

Further, components of the lock mechanism can be formed into an assembly, so that the lock mechanism can be readily mounted. Further, only the lock mechanism assembly can be removed for repair from the body housing, so that the efficiency of repairing work can be enhanced.

In the power tool of the present invention, typically, the spindle is rotationally driven by the motor to reciprocatingly drive the tool accessory within a prescribed angular range around the spindle rotation axis. Specifically, the tool accessory is driven to reciprocatingly rotate on the spindle rotation axis. The tool accessory suitably includes plural kinds of tools such as a cutting tool for cutting a workpiece and a grinding tool for grinding a workpiece. Thus, the tool accessory performs a cutting or grinding operation by reciprocating drive (vibration) of the tool accessory within a prescribed angular range. This power tool is also referred to as a vibration tool.

According to a further aspect of the power tool of the present invention, the power tool may have a biasing member that is disposed between the second end of the spindle and the lock mechanism. In this structure, the biasing member biases the lock mechanism engaged with the tool accessory holding member in a direction of the engagement region, so that the tool accessory can be held between the tool accessory fastening region and the spindle and fastened to the tool accessory fastening region.

As an example of the structure of holding the tool accessory between the tool accessory fastening region and the spindle, a flange-like clamp head may be provided on an end of the tool accessory fastening region, and a flange-like tool holding part may be provided on the end (first end) of the spindle facing the clamp head. With this structure, the tool accessory can be held between the clamp head and the tool holding part.

Further, in a region (engagement region) between the spindle and the lock mechanism, a hollow support member may be provided through which the tool accessory holding member is inserted. The support member may have a flange for supporting one end of the biasing member in the spindle rotation axis direction. In this structure, the other end of the biasing member may be supported by the lock mechanism.

According to a further aspect of the power tool of the present invention, the lock mechanism may include a clamp member and a collar member that supports the clamp member. The clamp member is configured to be movable between an engaging position for engaging with the tool accessory holding member to thereby lock the tool accessory holding member in the holding position, and a disengaging position for disengaging from the tool accessory holding member. In this structure, the collar member may form a collar member long region which is longer than the spindle in a crossing direction crossing the spindle rotation axis direction.

In the power tool according to this aspect, the above-described other end of the biasing member can be efficiently supported by providing the collar member long region. Specifically, the lock mechanism can be provided with a biasing member support region.

According to a further aspect of the power tool of the present invention, the biasing member may be formed by a coil spring. In this structure, by providing the coil spring having a larger outer diameter than the spindle, the coil spring can be provided with a coil spring long region. Further, the coil spring long region is formed in the crossing direction.

In the power tool according to this invention, the biasing member and the spindle are disposed in different regions, so that a desired coil spring can be used as the biasing member. For example, in the power tool according to this aspect, the coil spring having the coil spring long region may be used, so that the above-described support member can be disposed in the inside region of the coil spring.

According to a further aspect of the power tool of the present invention, the power tool may have a transmitting member that transmits the driving force of the motor to the spindle, and the motor may be arranged such that a motor rotation axis direction is parallel to the spindle rotation axis direction. In this structure, the transmitting member and the spindle may be arranged on the tool accessory fastening region side of the motor.

In the power tool according to this aspect, a position (fixed part) at which the transmitting member is fixed to the spindle is arranged on the tool accessory fastening region side of the motor, so that the spindle can be shortened in the spindle rotation axis direction.

Further, the tool accessory can be arranged closer to the transmitting member in the spindle rotation axis direction. Therefore, a couple of force which is generated according to the distance between the tool accessory and the transmitting member can be reduced. Thus, vibration which is caused by machining the workpiece with the tool accessory can be reduced.

Further, typically, the motor may have an eccentric shaft provided with a drive bearing, and the transmitting member may have a pair of arm parts which hold the drive bearing and a fixed part which is fixed to the spindle. In this case, the transmitting member may be substantially straight. With this structure, rotation of the arm parts by the eccentric shaft is transmitted to the spindle via the fixed part and causes reciprocating movement of the tool accessory. In this structure, a space between the eccentric shaft and the spindle can be effectively utilized to arrange the transmitting member.

According to a further aspect of the power tool of the present invention, the power tool may have a transmitting member that transmits the driving force of the motor to the spindle, and the transmitting member may have an arm part which receives the driving force of the motor, and a fixed part which is fixed to the spindle. In this structure, the motor is arranged such that a motor rotation axis direction extends in a direction crossing the spindle rotation axis direction, and the fixed part and the spindle are arranged on the tool accessory fastening region side of the motor.

In the power tool according to this aspect, with the arrangement of the fixed part on the tool accessory fastening region side of the motor, the spindle can be shortened in the spindle rotation axis direction.

Further, the tool accessory can be arranged closer to the transmitting member in the spindle rotation axis direction. Therefore, a couple of force which is generated according to the distance between the tool accessory and the transmitting member can be reduced. Thus, vibration which is caused by machining the workpiece with the tool accessory can be reduced.

Further, typically, the motor may have an eccentric shaft provided with a drive bearing, and the arm part may be formed by a pair of members which hold the drive bearing. In the transmitting member, although the arm part is arranged on the engagement region side and the fixed part is arranged on the tool accessory fastening region side, a space surrounded by the motor, the transmitting member and the spindle is effectively utilized so that a region of the transmitting member between the arm part and the fixed part can be formed into a curved or crank shape.

According to a further aspect of the power tool of the present invention, the clamp member and the collar member may have a sliding contact region to slide in contact with each other. The sliding contact region may have a first inclined element inclined with respect to the spindle rotation axis direction and a second inclined element inclined with respect to the spindle rotation axis direction. In this structure, the first inclined element and the second inclined element may be arranged apart from each other in the spindle rotation axis direction.

The clamp member can be allowed to move between the engaging position and the disengaging position by sliding contact of the clamp member and the collar member with each other. Typically, each of the first and second inclined elements may have an inclination inclined downward toward the spindle rotation axis. When the clamp member moves downward with respect to the collar member, the clamp member moves along the inclinations of the first and second inclined elements in a direction (inward) toward the spindle rotation axis in the crossing direction, so that the clamp member can be placed in the engaging position. On the other hand, when the clamp member moves upward with respect to the collar member, the clamp member moves along the inclinations of the first and second inclined elements in a direction away from the spindle rotation axis (outward) in the crossing direction, so that the clamp member can be placed in the disengaging position.

For the purpose of this movement, the inclination of the sliding contact region needs to have a lower end, an upper end and a continuous region extending between the lower end and the upper end in order to secure the relative movement of the clamp member and the collar member for a prescribed distance. In the case of the sliding contact region having a single inclination, one lower end, one upper end and one continuous region is provided. In the case of the sliding contact region having the first inclined element and the second inclined element, each of the first inclined element and the second inclined element can have the lower end, the upper end and the continuous region. Further, the lower end of the first inclined element can be arranged adjacent to the upper end of the second inclined element in the crossing direction. Thus, the distance between the upper end of the first inclined element and the lower end of the second inclined element in the crossing direction can be made shorter than the distance between the upper end and the lower end in the crossing direction in the sliding contact region having a single inclination.

Thus, in the power tool according to this aspect, the lock mechanism can be shortened in the crossing direction.

The sliding contact region (the first inclined element or the second inclined element) may be formed in a straight or curved shape, a combination of a plurality of continuously formed straight shapes or a combination of a plurality of continuously formed curved shapes. A representative example of the curved shape is a circular arc shape.

The definition of inclination of the sliding contact region with respect to the spindle rotation axis is that an extension line of the sliding contact region crosses the spindle rotation axis at a prescribed angle. As for the extension line of the sliding contact region, it is an extension line having a straight shape in the case of the sliding contact region having the straight shape, and it is a normal line having a circular arc shape in the case of the sliding contact region having the circular arc shape. Further, in the case of the sliding contact region having a combination of a plurality of continuously formed straight or curved shapes, a straight extension line connecting the upper end and the lower end of the sliding contact region can be defined as the extension line of the sliding contact region.

A prescribed angle of the first inclined element with respect to the spindle rotation axis direction and a prescribed angle of the second inclined element with respect to the spindle rotation axis direction may be the same or different from each other.

According to a further aspect of the power tool of the present invention, the collar member may have an inner region having a hole in which the clamp member is disposed and through which the engagement region of the tool accessory holding member is inserted, and an outer region which is formed outside of the inner region in the crossing direction. In this structure, the outer region may be provided with a bearing arrangement region in which a bearing for rotatably supporting the collar member is disposed.

When the collar member is in the engaging position and the spindle is rotated by the motor, the collar member is rotated as the tool accessory holding member is rotated. The bearing is provided to support rotation of the collar member with stability. In the power tool according to this aspect, by the arrangement of the bearing in the outer region of the collar member, the lock mechanism can be formed in a compact structure to contribute to size reduction of the power tool.

According to a further aspect of the power tool of the present invention, the collar member may be configured to be movable between a maintaining position for maintaining the clamp member in the engaging position and an allowing position for allowing the clamp member to move from the engaging position to the disengaging position. In this structure, the power tool may further has an operation mechanism which is configured to move the collar member between the maintaining position and the allowing position by user's manual operation. The operation mechanism may have a contact part which moves the collar member from the allowing position to the maintaining position.

Typically, the contact part may be formed by a cam connected to the handle part which is operated by a user.

In the power tool according to this aspect, the operation mechanism comes into direct contact with the collar member, so that the number of parts can be reduced and the power tool can be reduced in size.

According to the present invention, a more rational technique for increasing the degree of freedom in designing a power tool can be provided.

DETAILED DESCRIPTION OF THE INVENTION

Figure 9:
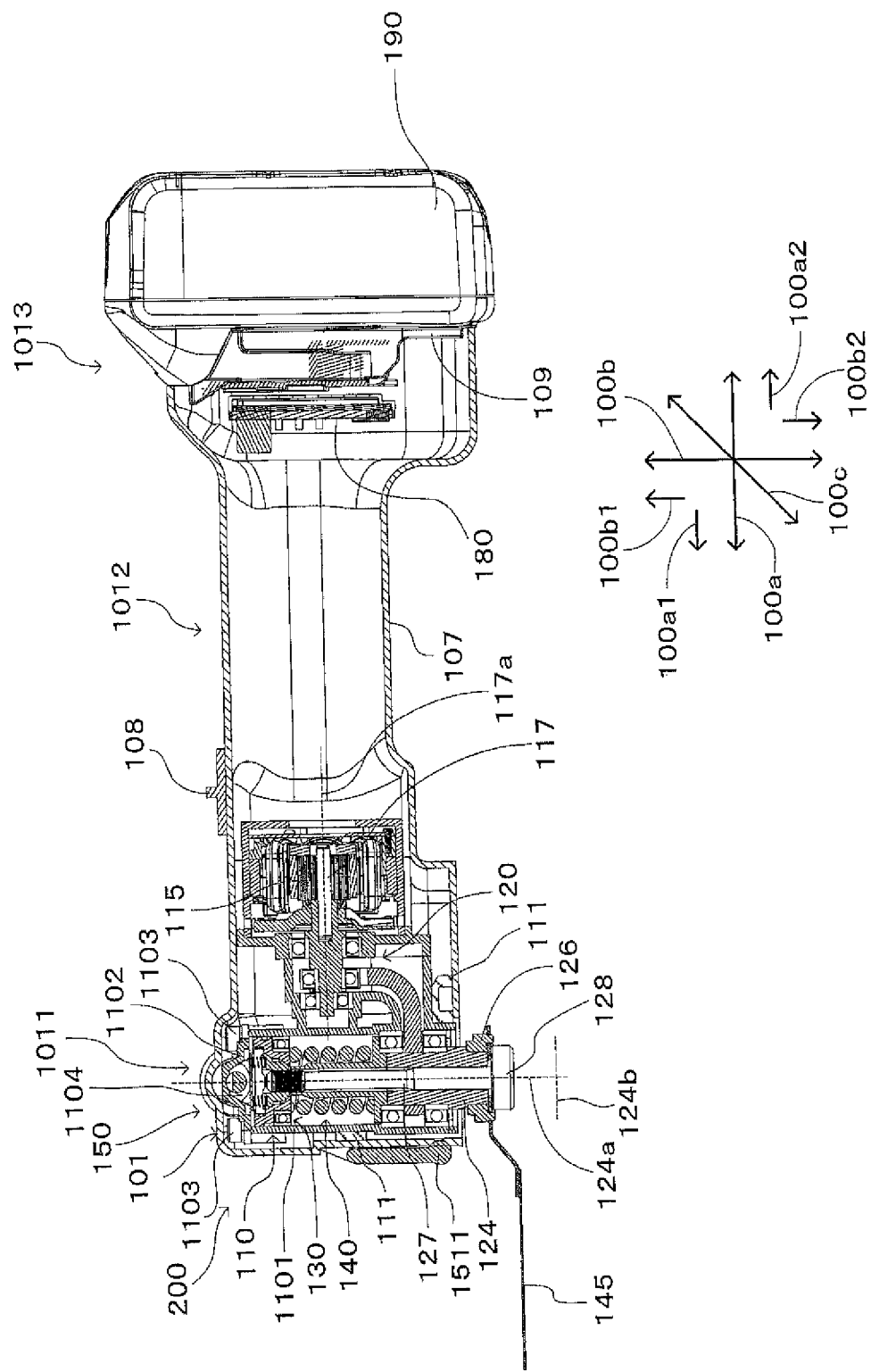
FIG. 9 is a sectional view showing an internal structure of an electric vibration tool according to a second embodiment of the present invention.
Figure 10:
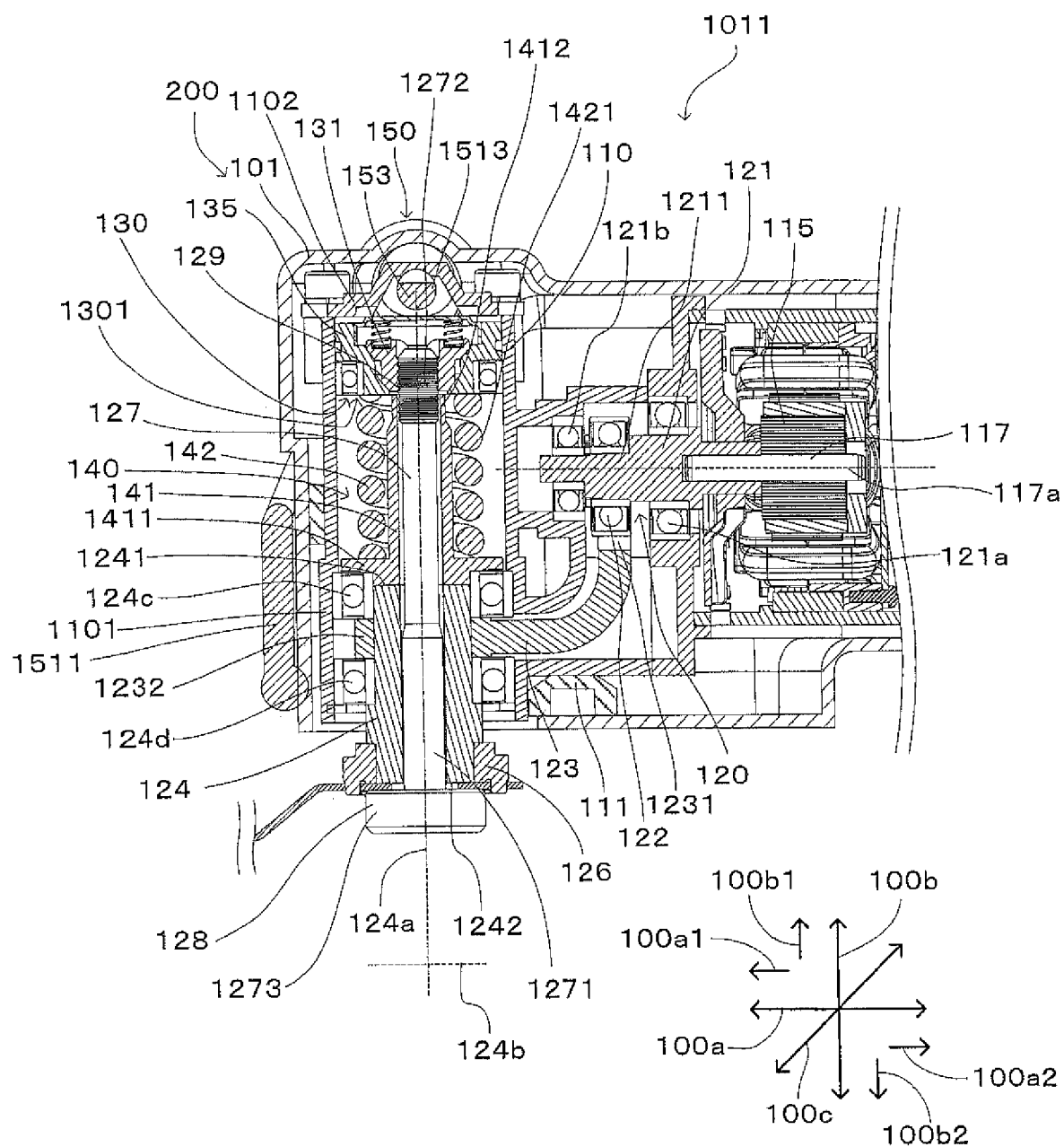
FIG. 10 is an enlarged sectional view showing an essential part of the vibration tool.

Representative embodiments of a power tool according to the present invention are now described with reference to FIGS. 1 to 10. FIGS. 1 to 8 show a power tool according to a first embodiment, and FIGS. 9 and 10 show a power tool according to a second embodiment.

Parts and mechanisms of the power tool in the second embodiment which are identical or similar to those in the first embodiment are given like designations and numerals as in the first embodiment, and they are not described here.

First Embodiment

Figure 1:
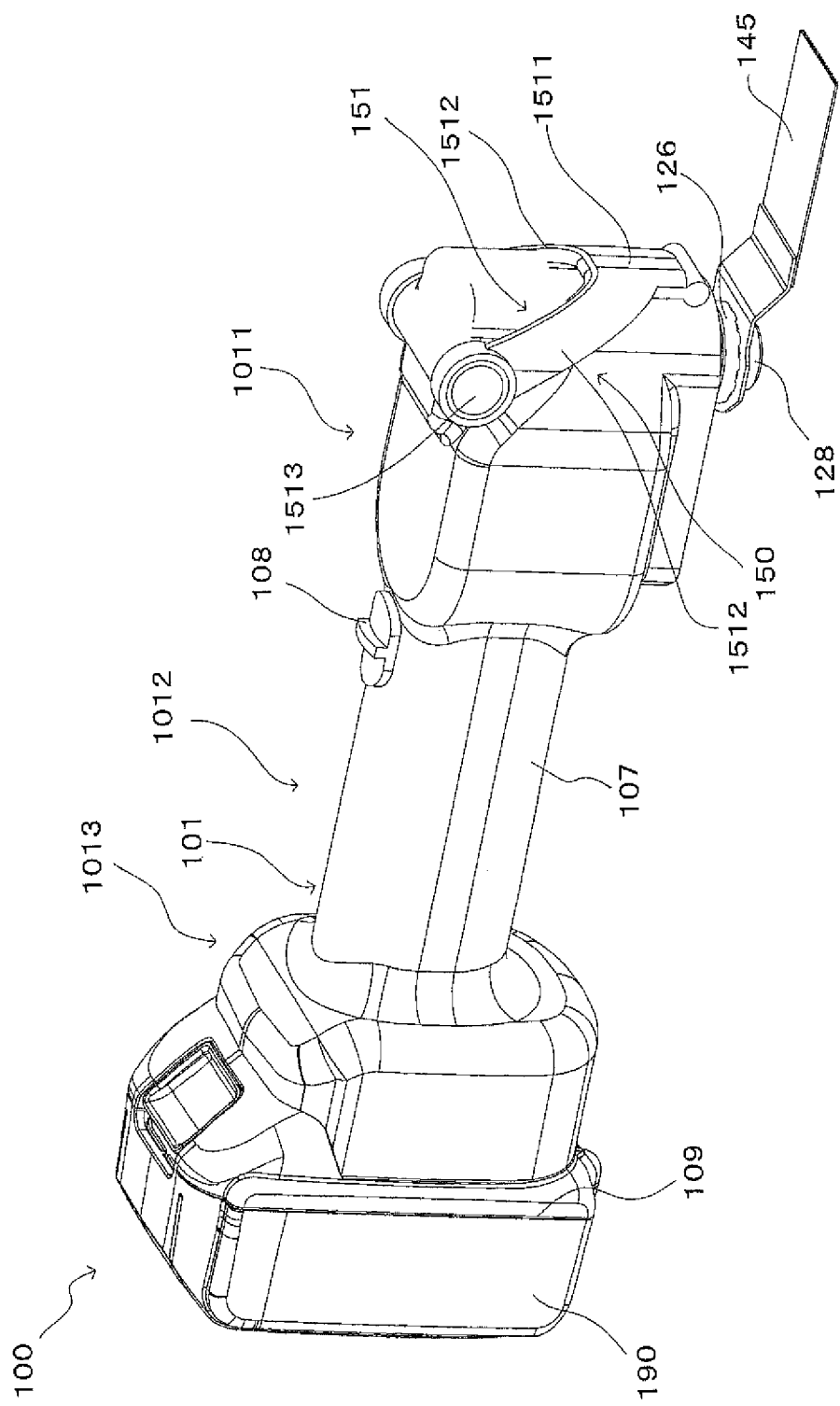
FIG. 1 is a perspective view showing the appearance of an electric vibration tool according to a first embodiment of the present invention.

The first embodiment of the present invention is now described with reference to FIGS. 1 to 8. In the first embodiment, an electric vibration tool 100 is described as a representative example of the power tool according to the present invention. As shown in FIG. 1, the electric vibration tool 100 has a tool accessory selected from plural kinds of tools such as a blade and a polishing pad and attached thereto and performs an operation such as a cutting operation and a polishing operation appropriate to the selected tool accessory on a workpiece by vibrating the attached tool accessory. In FIG. 1, a blade 145 is attached as a representative example of the tool accessory.

Figure 4:
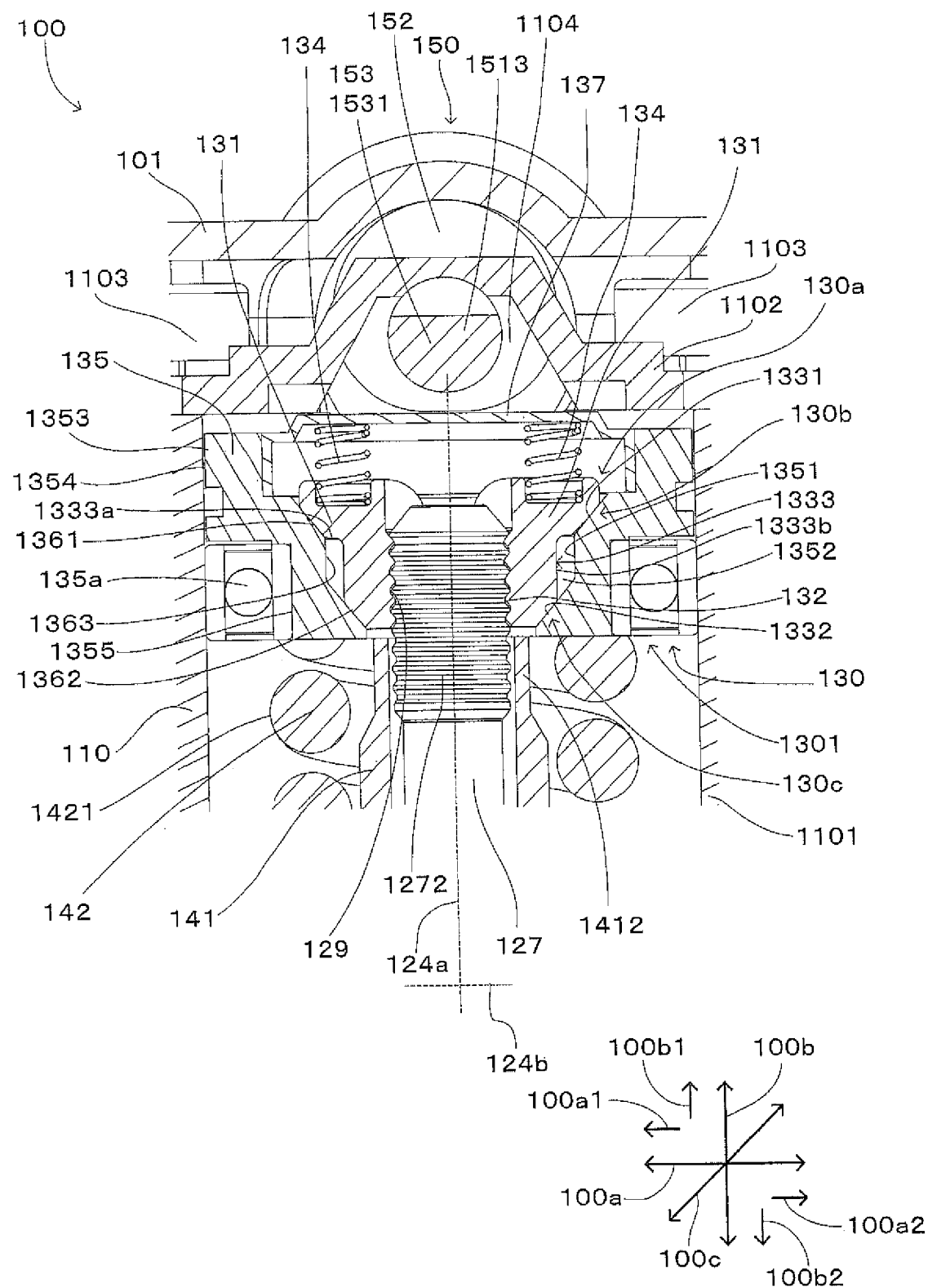
FIG. 4 is an enlarged sectional view showing a lock mechanism of the vibration tool.
Figure 5:
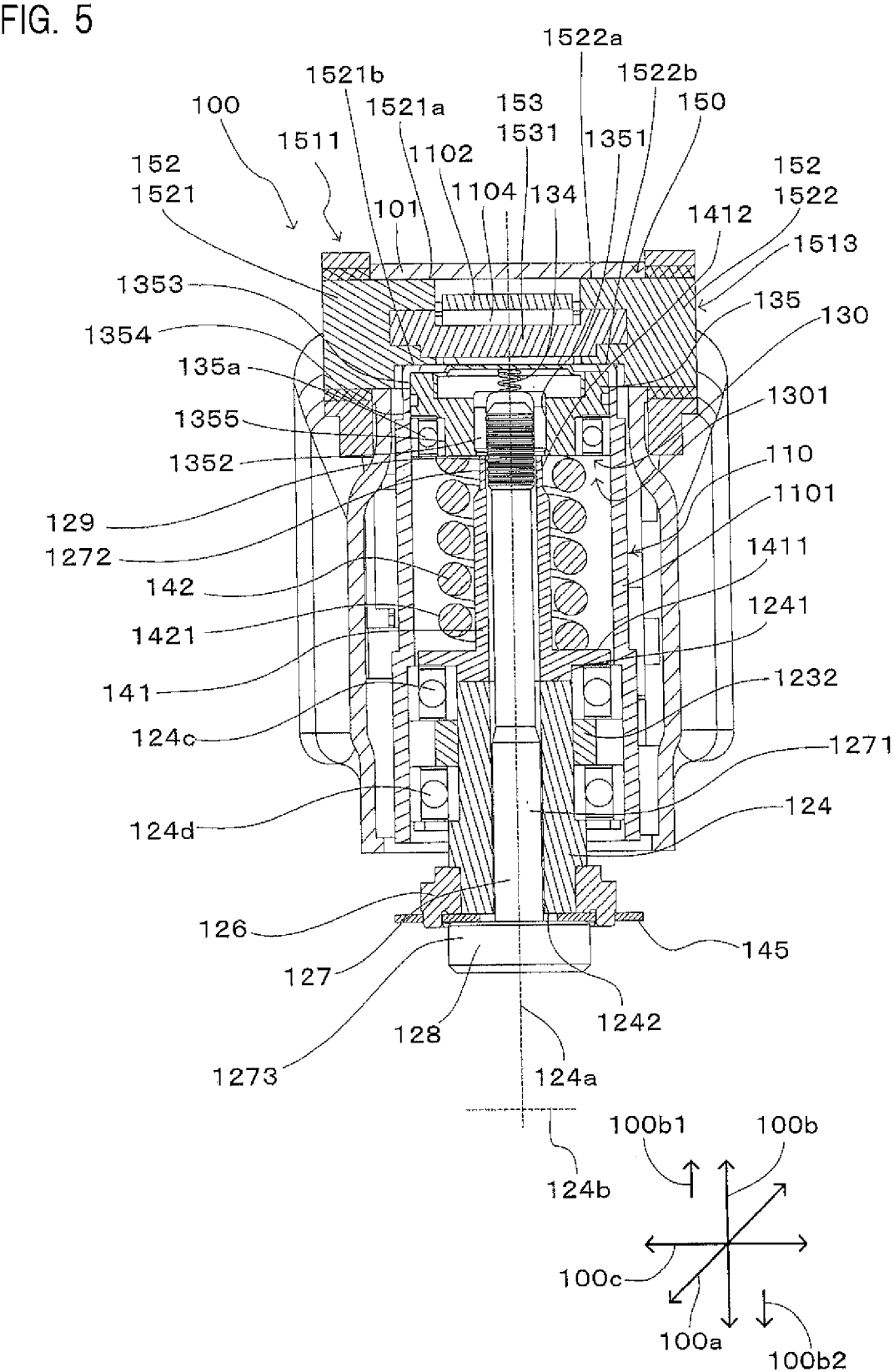
FIG. 5 is a sectional view of the vibration tool as viewed from the front.
Figure 6:
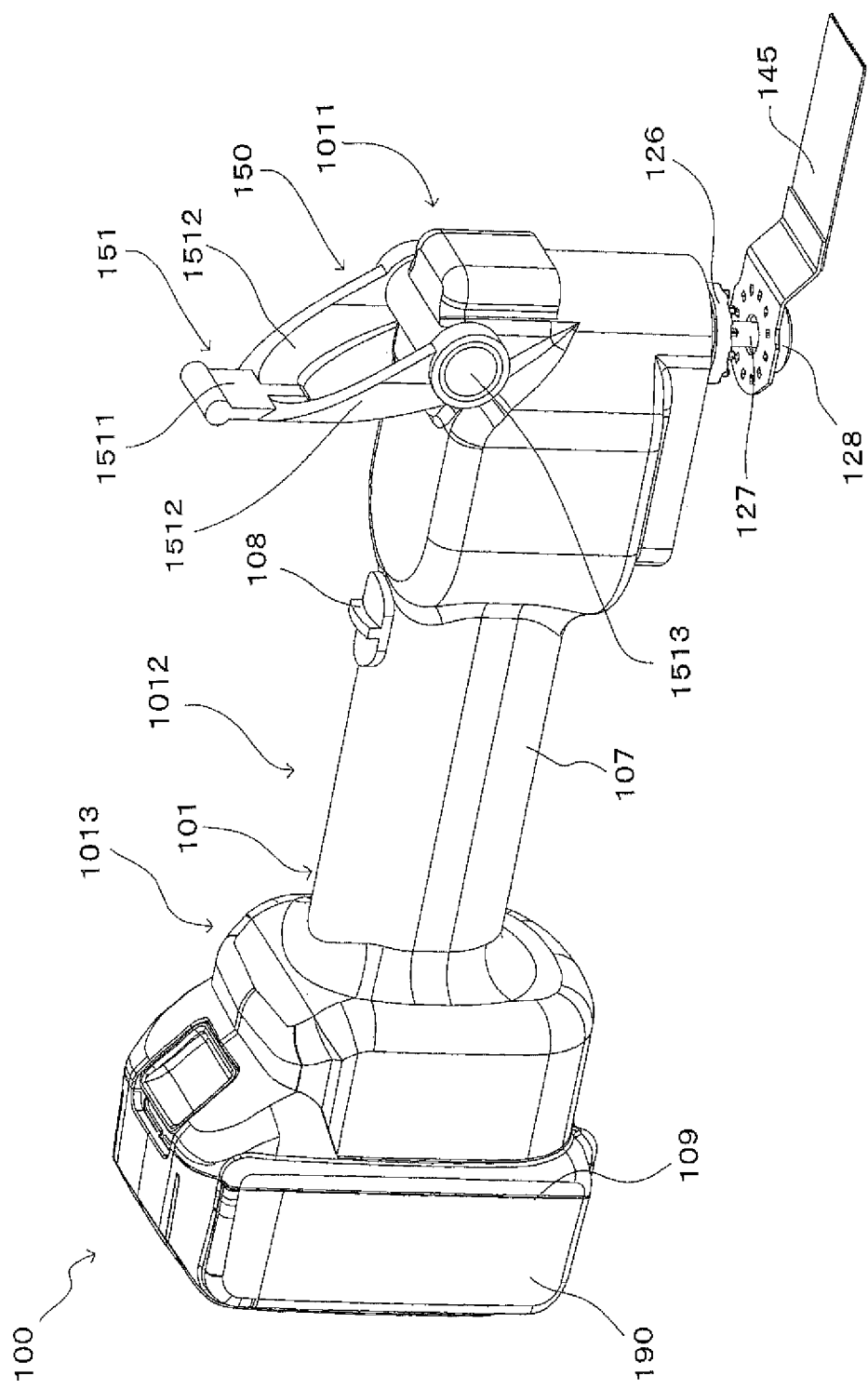
FIG. 6 is an outside view for illustrating replacement operation of a tool accessory.
Figure 7:
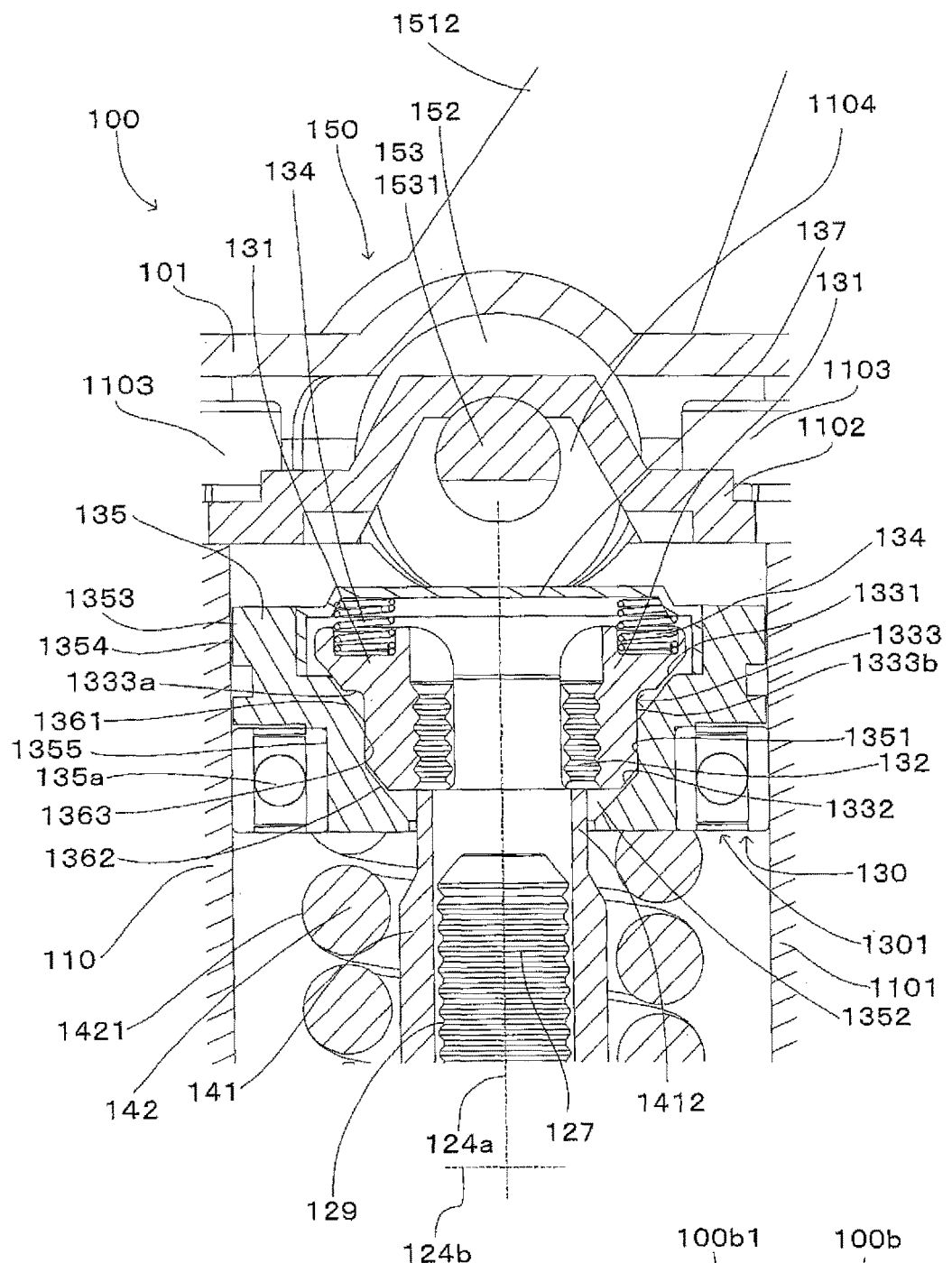
FIG. 7 is an enlarged sectional view for illustrating operation of a lock mechanism for replacement of the tool accessory.
Figure 7:
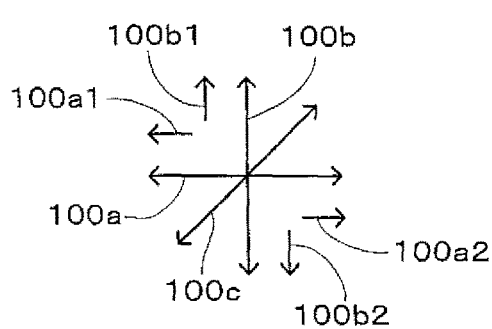
Figure 8:
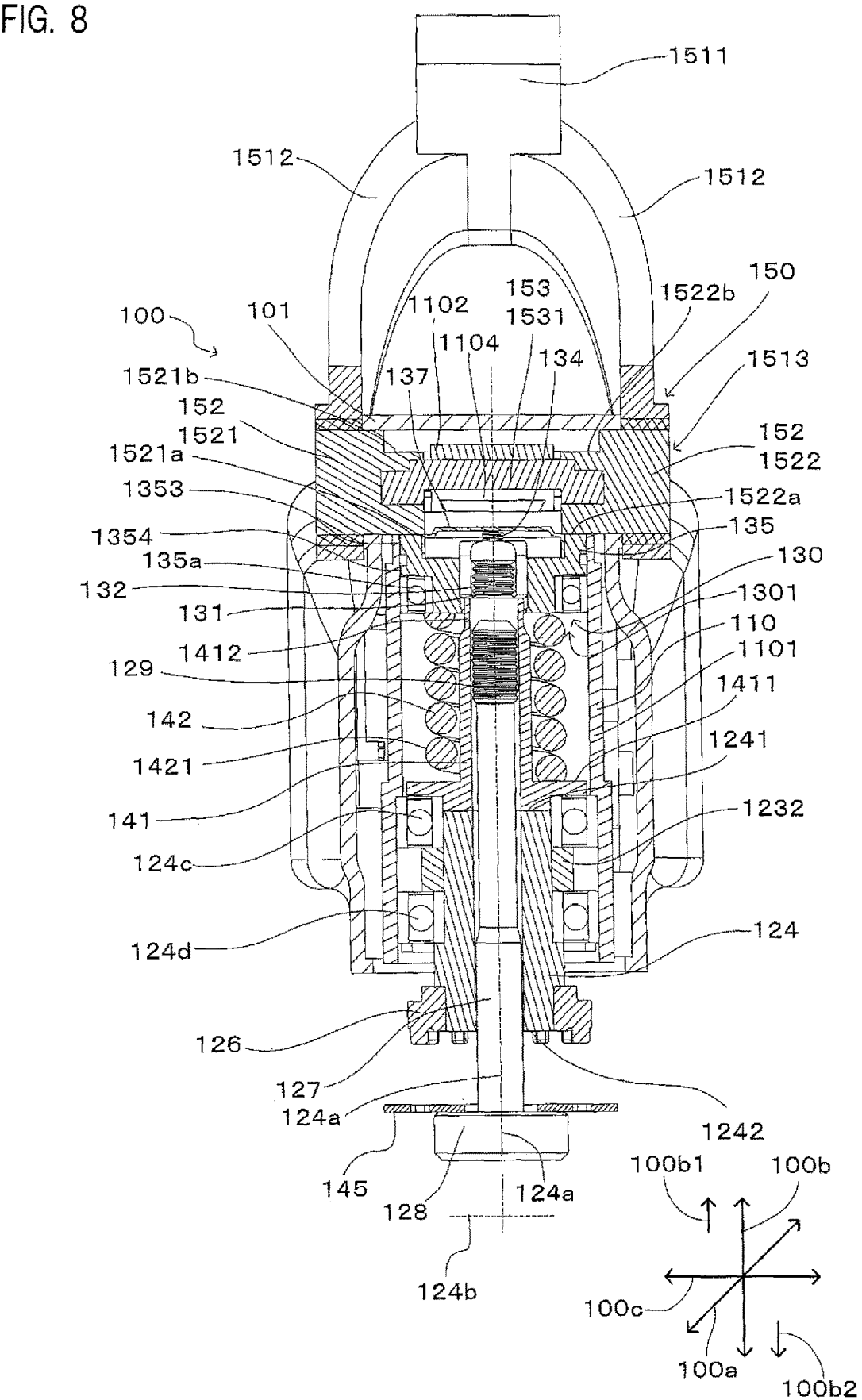
FIG. 8 is a sectional view for illustrating operation of a lock operation mechanism for replacement of the tool accessory.

FIGS. 1 to 5 show the state in which the blade 145 is attached to the vibration tool 100, and FIGS. 6 to 8 show the state in which the blade 145 is being detached from the vibration tool 100.

(Outline of the Electric Vibration Tool)

As shown in FIG. 1, the electric vibration tool 100 has a resin body housing 101 which forms an outer shell of the vibration tool 100. The body housing 101 is an example embodiment that corresponds to the "body housing" according to the present invention. The blade 145 is removably attached to one end region of the body housing 101 in the extending direction of the body housing 101, and a battery mounting part 109 to which a battery 190 is removably mounted is provided in the other end region of the body housing 101. The battery 190 is configured to be removable from the battery mounting part 109.

As shown in FIG. 1, the body housing 101 forms a grip part 107 to be held by a user. The grip part 107 is formed to extend in an elongate shape in an intermediate region 1012 between a front region 1011 and a rear region 1013 of the body housing 101. The battery 190 is attached to and detached from the battery mounting part 109 by sliding in a direction crossing the extending direction of the grip part 107. A slide switch 108 is provided at a position where a user's thumb is assumed to be placed when a user holds the grip part 107. The slide switch 108 and the battery mounting part 109 are electrically connected to a controller 180 (see FIG. 2). Therefore, a driving motor 115 (see FIG. 2) is turned on and off by operating the slide switch 108. When turning on the slide switch 108, the user can select a first mode for driving the driving motor 115 at a prescribed speed or a second mode for driving the driving motor 115 at higher speed than the speed of the first mode. The controller 180 controls the driving motor 115 according to the operation of the slide switch 108.

Figure 2:
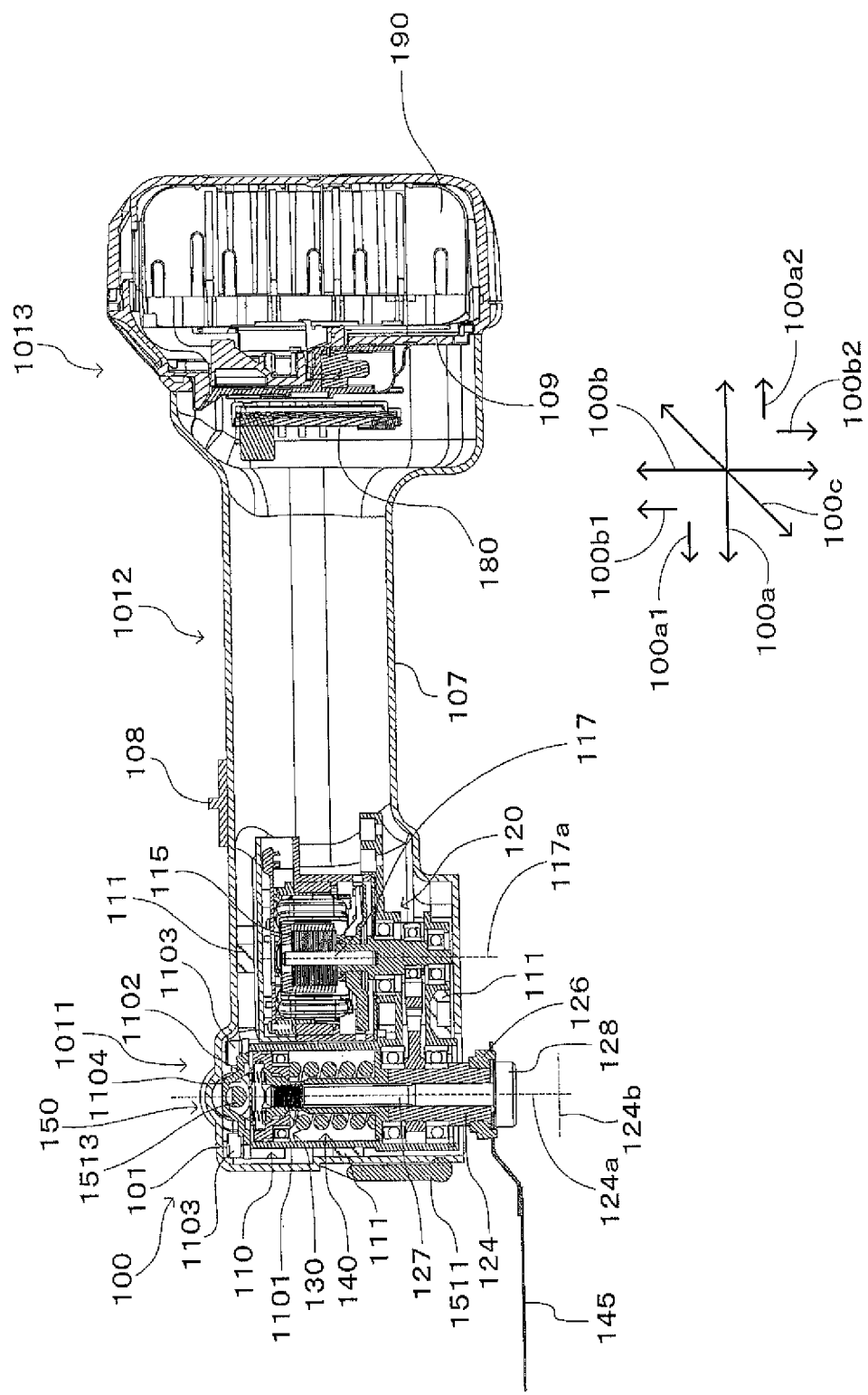
FIG. 2 is a sectional view showing an internal structure of the vibration tool.

As shown in FIG. 2, the electric vibration tool 100 has a driving mechanism 120 for driving the blade 145, and a lock mechanism 130 for removably attaching the blade 145 to the body housing 101. The lock mechanism 130 is operated with a lock operation mechanism 150 shown in FIG. 1. The lock operation mechanism 150 is an example embodiment that corresponds to the "operation mechanism" according to the present invention. As shown in FIG. 1, the lock operation mechanism 150 has a handle part 151 which is arranged on the outside of the front region 1011 and a pivot shaft 1513 which is connected to the handle part 151 in the front region 1011 and disposed inside the body housing 101. The handle part 151 has a grip 1511 to be held by a user and a pair of arms 1512 extending from the grip 1511. The pivot shaft 1513 extends between the arms 1512 and is connected to the arms 1512.

FIG. 1 shows the handle part 151 in a blade locking position, and FIG. 6 shows the handle part 151 in a blade replacement position. When the handle part 151 is placed in the blade locking position, the lock mechanism 130 locks the blade 145 to the vibration tool 100. When the handle part 151 is placed in the blade replacement position, the lock mechanism 130 releases the lock of the blade 145, so that the blade 145 can be detached from or attached to the vibration tool 100.

FIG. 2 is a sectional view of the vibration tool 100. The body housing 101 houses an inner housing 110. The inner housing 110 has a first inner housing 1101 and a second inner housing 1102. The first inner housing 1101 and the second inner housing 1102 are formed of metal and connected to each other with connecting members 1103 such as screws. A prescribed space region 1104 is provided between the first inner housing 1101 and the second inner housing 1102.

The inner housing 110 is connected to the body housing 101 via a plurality of elastic members 111. The elastic members 111 can reduce vibration which is caused in the inner housing 110 and transmitted to the body housing 101.

As shown in FIG. 2, the first inner housing 1101 houses the driving mechanism 120 and the lock mechanism 130. The lock mechanism 130 is an example embodiment that corresponds to the "lock mechanism" according to the present invention. Further, as shown in FIG. 5, the pivot shaft 1513 of the lock operation mechanism 150 extends through the space region 1104.

As shown in FIG. 2, the driving mechanism 120 has a rotatable spindle 124. A spindle rotation axis direction 124a defines a crossing direction 124b crossing the spindle rotation axis direction 124a. The spindle 124, the spindle rotation axis direction 124a and the crossing direction 124b are example embodiments that correspond to the "spindle", the "spindle rotation axis direction" and the "crossing direction", respectively, according to the present invention.

Further, in the electric vibration tool 100, the extending direction of the grip part 107 defines a longitudinal direction 100a. In a vibration tool crossing direction crossing the longitudinal direction 100a, a direction parallel to the spindle rotation axis direction 124a defines a height direction 100b. Further, in the vibration tool crossing direction, a direction crossing both the height direction 100b and the longitudinal direction 100a defines a width direction 100c. The longitudinal direction 100a defines a front side 100a1 on which the blade 145 is arranged, and a rear side 100a2 opposite to the front side 100a1. The height direction 100b defines a lower side 100b2 on which the blade 145 is arranged, and an upper side 100b1 opposite to the lower side 100b2.

(Driving Mechanism)

Figure 3:
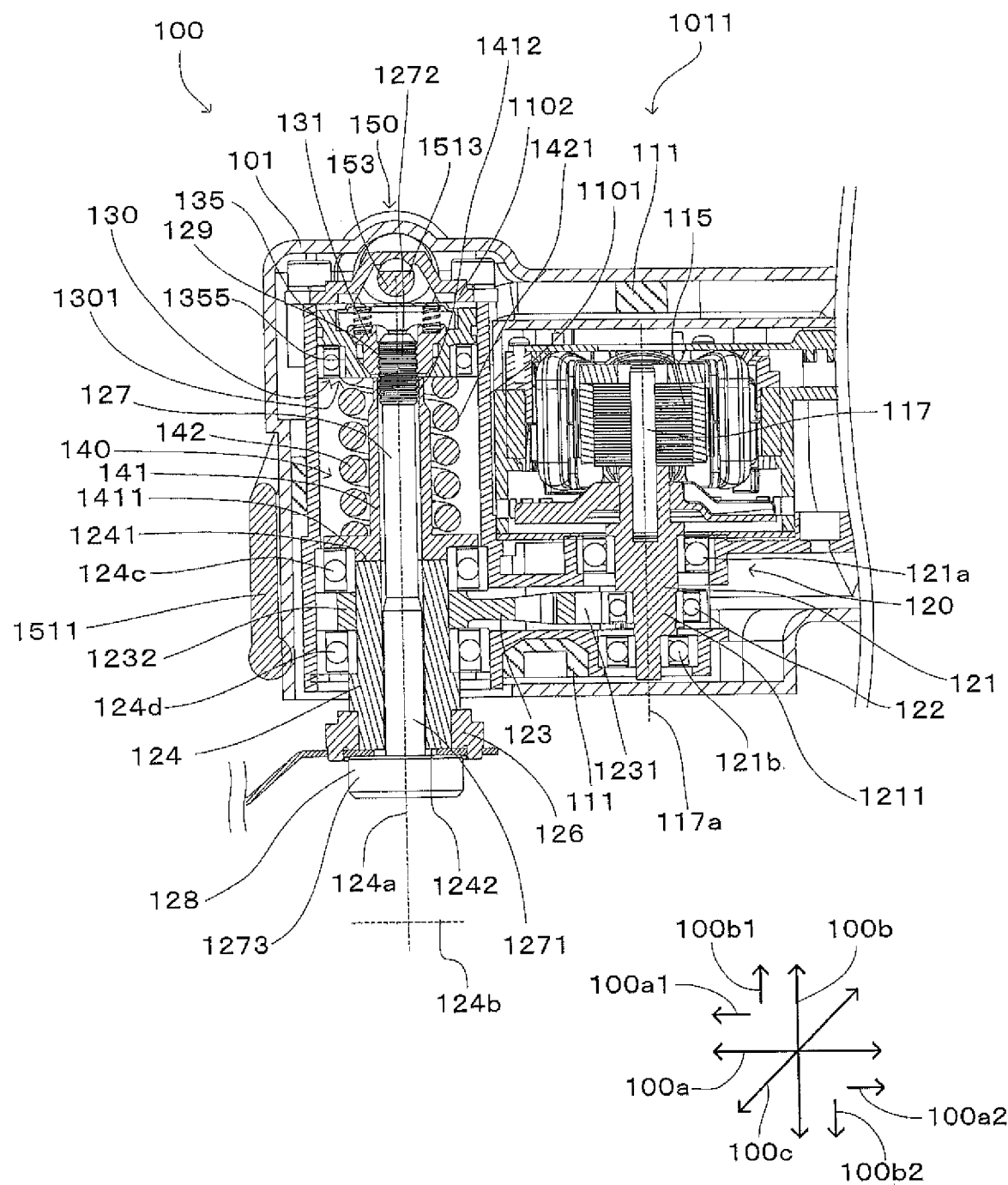
FIG. 3 is an enlarged sectional view showing an essential part of the vibration tool.

As shown in FIG. 2 or 3, the driving mechanism 120 is configured as a mechanism for driving the blade 145. The driving mechanism 120 mainly includes the driving motor 115, an eccentric shaft 121, a drive bearing 122, a driven arm 123, the spindle 124 and a clamp shaft 127. The driving motor 115, the driven arm 123 and the clamp shaft 127 are example embodiments that correspond to the "motor", the "transmitting member" and the "tool accessory holding member", respectively, according to the present invention.

As shown in FIG. 3, the driving motor 115 is configured as a brushless motor. The driving motor 115 is arranged such that an output shaft 117 extends in the height direction 100b. Specifically, the driving motor 115 is arranged in the inner housing 110 such that a motor rotation axis direction 117a is parallel to the spindle rotation axis direction 124a.

The eccentric shaft 121 is mounted onto an end of the output shaft 117 of the driving motor 115 and has an eccentric part 1211 which is eccentric to the motor rotation axis direction 117a. The eccentric shaft 121 is rotatably supported by a bearing 121a on the upper side 100b1 and a bearing 121b on the lower side 100b2. The bearings 121a, 121b are held by the first inner housing 1101. The drive bearing 122 is fitted on the outer periphery of the eccentric part 1211. The drive bearing 122 is disposed between the bearings 121a, 121b in the height direction 100b.

As shown in FIG. 3, the driven arm 123 is provided to extend in the longitudinal direction 100a and connect the drive bearing 122 and the spindle 124. A pair of arm parts 1231 are formed in a region of the driven arm 123 on the rear side 100a2. The arm parts 1231 are disposed in contact with the outer periphery of the drive bearing 122 in the width direction 100c. A fixed part 1232 is formed in a region of the driven arm 123 on the front side 100a1. The fixed part 1232 is configured to surround a prescribed region of the spindle 124 and fixed to the spindle 124.

The driven arm 123 and the spindle 124 are arranged on the lower side 100b2 of the driving motor 115. With this structure, the driving mechanism 120 can be shortened in the spindle rotation axis direction 124a.

Further, with this structure, the blade 145 can be arranged closer to the driven arm 123 for driving the spindle 124 in the spindle rotation axis direction 124a. Therefore, a couple of force which is generated according to the distance between the driven arm 123 and the blade 145 is reduced. Thus, vibration which is caused by machining the workpiece with the blade 145 is reduced.

As shown in FIG. 3, the spindle 124 is a long member having a generally cylindrical hollow shape. The spindle 124 has a flange-like tool holding part 126 on the lower side 100b2 for holding the blade 145 in cooperation with the clamp shaft 127. The spindle 124 is rotatably supported by a bearing 124c on the upper side 100b1 and a bearing 124d on the lower side 100b2. The bearings 124c, 124d are held by the inner housing 110.

As shown in FIG. 3, the clamp shaft 127 is a generally cylindrical member which can be inserted into the spindle 124. The clamp shaft 127 has a spindle inner region 1271 which is disposed inside the spindle 124, a fastening region 1273 which protrudes from a lower end 1242 of the spindle 124, and an engagement region 1272 which protrudes from an upper end 1241 of the spindle 124, when the clamp shaft 127 is inserted into the spindle 124. The spindle inner region 1271, the fastening region 1273 and the engagement region 1272 are example embodiments that correspond to the "spindle inner region", the "fastening region" and the "engagement region", respectively, according to the present invention. The lower end 1242 of the spindle 124 and the upper end 1241 of the spindle 124 are example embodiments that correspond to the "first end" and the "second end", respectively, according to the present invention.

As shown in FIG. 3, a flange-like clamp head 128 is integrally formed in the fastening region 1273, and a clamp member engagement groove 129 is formed in the engagement region 1272. When the clamp shaft 127 is inserted into the spindle 124 and held by the lock mechanism 130, the blade 145 is held between the clamp head 128 of the clamp shaft 127 and the tool holding part 126 of the spindle 124.

When the driving motor 115 is driven and the output shaft 117 is rotated, the center of the eccentric part 1211 rotates around the motor rotation axis 117a. Thus, the drive bearing 122 reciprocates in the width direction 100c, and the driven arm 123 is driven to reciprocatingly rotate on the rotation axis of the spindle 124. As a result, the blade 145 held between the spindle 124 and the clamp shaft 127 is driven to reciprocatingly rotate, so that a prescribed operation such as a cutting operation can be performed.

(Lock Mechanism and Biasing Mechanism)

The lock mechanism 130 and a biasing mechanism 140 are now explained with reference to FIGS. 3 to 5. FIG. 4 is an enlarged sectional view showing the lock mechanism 130, and FIG. 5 is a front sectional view showing the lock mechanism 130 and the biasing mechanism 140. The lock mechanism 130 serves to hold the clamp shaft 127, and the biasing mechanism 140 serves to bias the clamp shaft 127 in a direction from the lower side 100b2 to the upper side 100b1. The lock mechanism 130 and the biasing mechanism 140 are disposed in the first inner housing 1101 having a cylindrical shape.

As shown in FIG. 4, the lock mechanism 130 mainly includes a clamp member 131, a collar member 135, a first coil spring 134, a lid member 137 and a bearing 135a. These components of the lock mechanism 130 form a lock mechanism assembly 1301. The clamp member 131, the collar member 135 and the bearing 135a are example embodiments that correspond to the "clamp member", the "collar member" and the "bearing", respectively, according to the present invention.

As shown in FIG. 3, the biasing mechanism 140 mainly includes a support member 141 and a second coil spring 142. The second coil spring 142 is an example embodiment that corresponds to the "biasing member" according to the present invention.

The structure of the biasing mechanism 140 is now explained with reference to FIGS. 3 and 5. The support member 141 has a generally cylindrical hollow shape through which the engagement region 1272 of the clamp shaft 127 is inserted. The support member 141 is rotatably supported by the bearing 124c. The bearing 124c is configured to support both the spindle 124 and the support member 141. With this structure, the number of bearings can be reduced, and the vibration tool 100 can be shortened in the spindle rotation axis direction 124a.

The support member 141 has a flange-like coil spring support part 1411 formed on the lower side 100b2 to be held in contact with a lower end of the second coil spring 142, and a clamp member support part 1412 formed on the upper side 100b1 to support the clamp member 131. Further, the clamp member support part 1412 supports the clamp member 131 when the clamp member 131 is placed in a position (disengaging position) for replacement of the blade 145, which is described below.

The second coil spring 142 has a long region 1421 having a larger outer diameter than the spindle 124. In the second coil spring 142 having the long region 1421, the support member 141 can be disposed in the inside region of the second coil spring 142. The coil spring long region 1421 is an example embodiment that corresponds to the "coil spring long region" according to the present invention.

The end of the second coil spring 142 on the lower side 100b2 is held in contact with the support member 141 as described above, and the other end on the upper side 100b1 is held in contact with the collar member 135. Thus, the second coil spring 142 is disposed between the upper end 1241 of the spindle 124 and the lock mechanism 130.

The structure of the lock mechanism 130 is now explained with reference to FIG. 4. The lock mechanism 130 is disposed between an end of the support member 141 on the upper side 100b1 and the body housing 101 in the spindle rotation axis direction 124a. In other words, the lock mechanism 130 is disposed between the upper end 1241 of the spindle 124 and a wall of the body housing 101. The lock mechanism 130 and the spindle 124 are configured independently and arranged apart from each other, so that the lock mechanism 130 can be designed without depending on the design of the spindle 124.

Further, the lock mechanism 130 forming the lock mechanism assembly 1301 can be readily mounted, and only the lock mechanism assembly 1301 can be removed for repair.

As shown in FIG. 4, the clamp member 131 consists of a pair of members which hold the engagement region 1272 of the clamp shaft 127 in a radial direction of the clamp shaft 127. Each clamp member 131 is configured to be movable in the crossing direction 124b. A plurality of ridge parts 132 are formed on an inner surface of the clamp member 131 facing the clamp shaft 127 and can engage with the clamp member engagement groove 129 of the clamp shaft 127. The clamp member 131 further has a first clamp member inclined part 1331 and a second clamp member inclined part 1332 which are inclined with respect to the spindle rotation axis direction 124a. The inclined surfaces of the first and second clamp member inclined parts 1331, 1332 are straight, and an angle of an extension line of the inclined surface of the first clamp member inclined part 1331 with respect to the spindle rotation axis direction 124a is the same as an angle of an extension line of the inclined surface of the second clamp member inclined part 1332 with respect to the spindle rotation axis direction 124a.

Further, a clamp member inclination connecting part 1333 is formed between the first and second clamp member inclined parts 1331, 1332. The clamp member inclination connecting part 1333 includes a first extending region 1333a extending inward in the crossing direction 124b from an end of the first clamp member inclined part 1331 on the lower side 100b2 and a second extending region 1333b extending in the spindle rotation axis direction 124a from an inner end of the first extending region 1333a to an end of the second clamp member inclined part 1332 on the upper side 100b1. By providing the clamp member inclination connecting part 1333, the first and second clamp member inclined parts 1331, 1332 can be arranged apart from each other in the spindle rotation axis direction 124a. Further, in the crossing direction 124b, the end of the first clamp member inclined part 1331 on the lower side 100b2 can be arranged adjacent to the end of the second clamp member inclined part 1332 on the upper side 100b1 via the first extending region 1333a. Thus, the first and second clamp member inclined parts 1331, 1332 can be shortened in the crossing direction 124b.

As shown in FIG. 4, the first coil spring 134 is disposed between each of the clamp members 131 and the lid member 137. The first coil spring 134 biases the clamp member 131 to the lower side 100b2 so as to stabilize the attitude of the clamp member 131.

As shown in FIG. 4, the collar member 135 serves to control clamping of the clamp shaft 127 by the clamp members 131. The collar member 135 has an inner region 1351 having a hole 352 in which the clamp members 131 are disposed and through which the engagement region 1272 of the clamp shaft 127 is inserted, and an outer region 1353 formed outside of the inner region 1351 in the crossing direction 124b. The hole 1352, the inner region 1351 and the outer region 1353 are example embodiments that correspond to the "hole", the "inner region" and the "outer region", respectively, according to the present invention. The lid member 137 is arranged to cover the inner region 1351.

The collar member 135 has a collar member long region 1354 which is longer than the spindle 124 in the crossing direction 124b. By providing the collar member long region 1354, the collar member 135 can receive the end of the second coil spring 142 on the upper side 100b1. The collar member long region 1354 is an example embodiment that corresponds to the "collar member long region" according to the present invention.

The outer region 1353 of the collar member 135 has a bearing arrangement region 1355 in which the bearing 135a for rotatably supporting the collar member 135 is disposed. The bearing arrangement region 1355 is an example embodiment that corresponds to the "bearing arrangement region" according to the present invention. By providing the bearing arrangement region 1355, it is made unnecessary to provide an arrangement region for the bearing 135a in a region of the collar member 135 in the spindle rotation axis direction 124a. Therefore, the collar member 135 can be shortened in the spindle rotation axis direction 124a.

The bearing arrangement region 1355 is formed like a notch in the outer periphery of the collar member 135, so that the bearing 135a can be compactly arranged onto the collar member 135.

The outer periphery of the bearing 135a is slidably arranged in the inner housing 110. With this structure, the lock mechanism assembly 1301 is allowed to move in the spindle rotation axis direction 124a. Further, a clearance is formed between the outer region 1353 not having the bearing 135a and the inner housing 110. Specifically, in the lock mechanism assembly 1301, the bearing 135a forms a contact element with respect to the inner housing 110, and the outer region 1353 forms a non-contact element with respect to the inner housing 110. With this structure, abnormal noise which is generated when the lock mechanism assembly 1301 is rotated can be reduced.

The collar member 135, the clamp members 131 and the bearing 135a are arranged along the crossing direction 124b. With this structure, the lock mechanism 130 can be shortened in the spindle rotation axis direction 124a.

As shown in FIG. 4, the collar member 135 has a first collar member inclined part 1361 and a second collar member inclined part 1362 which are inclined with respect to the spindle rotation axis direction 124a. The inclined surfaces of the first and second collar member inclined parts 1361, 1362 are straight, and an angle of an extension line of the inclined surface of the first collar member inclined part 1361 with respect to the spindle rotation axis direction 124a is the same as an angle of an extension line of the inclined surface of the second collar member inclined part 1362 with respect to the spindle rotation axis direction 124a.

Further, a collar member inclination connecting part 1363 is formed between the first and second collar member inclined parts 1361, 1362. The extending direction of the collar member inclination connecting part 1363 is parallel to the spindle rotation axis direction 124a. With this structure, the first and second collar member inclined parts 1361, 1362 can be arranged apart from each other in the spindle rotation axis direction 124a. Further, an end of the first collar member inclined part 1361 on the lower side 100b2 and an end of the second collar member inclined part 1362 on the upper side 100b1 are arranged on a line extending in the spindle rotation axis direction 124a. Thus, the first and second collar member inclined parts 1361, 1362 can be shortened in the crossing direction 124b.

The first collar member inclined part 1361 and the second collar member inclined part 1362 are configured to slide in contact with the first clamp member inclined part 1331 and the second clamp member inclined part 1332, respectively. Specifically, the collar member 135 and the clamp member 131 form a sliding contact region 130a. The sliding contact region 130a is an example embodiment that corresponds to the "sliding contact region" according to the present invention. In the sliding contact region 130a, the first collar member inclined part 1361 and the first clamp member inclined part 1331 form a first inclined element 130b, and the second collar member inclined part 1362 and the second clamp member inclined part 1332 form a second inclined element 130c. The first inclined element 130b and the second inclined element 130c are example embodiments that correspond to the "first inclined element" and the "second inclined element", respectively, according to the present invention.

As shown in FIG. 4, the collar member 135 is biased by the second coil spring 142 and the clamp member 131 is biased by the first coil spring 134, so that the first collar member inclined part 1361 comes in contact with the first clamp member inclined part 1331 and the second collar member inclined part 1362 comes in contact with the second clamp member inclined part 1332. Thus, the clamp member 131 is moved inward in the radial direction of the clamp shaft 127. As a result, the two clamp members 131 hold the clamp shaft 127 while the ridge parts 132 of the clamp members 131 are engaged with the clamp member engagement groove 129 of the clamp shaft 127. The clamp shaft 127 is held between the clamp members 131 and biased to the upper side 100b1 by the second coil spring 142. In this manner, the blade 145 is held between the clamp head 128 of the clamp shaft 127 and the tool holding part 126 of the spindle 124.

In this state, the position of the clamp shaft 127 defines a holding position for holding the blade 145, the position of the clamp member 131 defines an engaging position for engaging with the clamp shaft 127, and the position of the collar member 135 defines a maintaining position for maintaining the clamp member 131 in the engaging position. When the blade 145 is removed from the vibration tool 100, which is explained below with reference to FIGS. 6 to 8, the collar member 135 moves to an allowing position for allowing the clamp member 131 to move to a disengaging position, the clamp member 131 moves to the disengaging position for disengaging from the clamp shaft 127, and the clamp shaft 127 moves to a release position for releasing the blade 145.

(Lock Operation Mechanism)

The lock operation mechanism 150 is configured to operate the lock mechanism 130. More specifically, the lock operation mechanism 150 is configured to move the collar member 135 in the spindle rotation axis direction 124a. By the movement of the collar member 135 in the spindle rotation axis direction 124a, the clamp member 131 is switched between the engaging position and the disengaging position with respect to the clamp shaft 127.

FIGS. 1 to 5 show the state in which the clamp member 131 is placed in the engaging position by the lock operation mechanism 150, and FIGS. 6 to 8 show the state in which the clamp member 131 is allowed to move to the disengaging position by the lock operation mechanism 150.

As shown in FIG. 5, the pivot shaft 1513 connected to the handle part 151 is arranged to extend through the body housing 101 in the width direction 100c so as to be disposed in the space region 1104 formed between the first inner housing 1101 and the second inner housing 1102. A switching part 152 is provided on the both ends of the pivot shaft 1513 and configured to be allowed to come into contact with the collar member 135. The switching part 152 includes a first cam 1521 and a second cam 1522. The first cam 1521 has a first contact part 1521a which can come into contact with the collar member 135, and a first notch part 1521b which can be separated from the collar member 135. The second cam 1522 has a second contact part 1522a which can come into contact with the collar member 135, and a second notch part 1522b which can be separated from the collar member 135. The first contact part 1521a and the second contact part 1522a are example embodiments that correspond to the "contact part" according to the present invention.

A switching connection part 153 is provided between the first cam 1521 and the second cam 1522 in the pivot shaft 1513. An eccentric shaft 1531 forms the switching connection part 153 and has a rotation axis eccentric to the rotation axis of the pivot shaft 1513. Specifically, the pivot shaft 1513 is formed with the switching part 152 and the switching connection part 153. Thus, the switching part 152 and the switching connection part 153 are rotated interlocking with turning operation of the handle part 151.

When the handle part 151 is placed in the blade locking position as shown in FIG. 1, the first notch part 1521b and the second notch part 1522b of the switching part 152 (the first cam 1521 and the second cam 1522) are located on the upper side 100b1 of the collar member 135 as shown in FIG. 5. Therefore, the switching part 152 releases the collar member 135. At this time, the collar member 135 is biased to the upper side 100b1 by the second coil spring 142, and the first collar member inclined part 1361 and the second collar member inclined part 1362 come in contact with the first clamp member inclined part 1331 and the second clamp member inclined part 1332, respectively. As a result, the two clamp members 131 are moved toward the clamp shaft 127 and hold the clamp shaft 127. Further, the switching connection part 153 (the eccentric shaft 1531) is placed apart from the second inner housing 1102. Thus, transmission of vibration to the second inner housing 1102 via the switching connection part 153 can be reduced.

In this state, as shown in FIG. 4, the clamp member support part 1412 of the support member 141 is held in non-contact with the clamp members 131.

As described above, in this state, the position of the clamp shaft 127 defines a holding position for holding the blade 145, the position of the clamp member 131 defines an engaging position for engaging with the clamp shaft 127, and the position of the collar member 135 defines a maintaining position for maintaining the clamp member 131 in the engaging position.

When the handle part 151 is placed in the blade replacement position as shown in FIG. 6, the first contact part 1521a and the second contact part 1522a of the switching part 152 come into contact with the collar member 135 as shown in FIG. 8 and move the collar member 135 to the lower side 100b2 against the biasing force of the second coil spring 142. As a result, as shown in FIG. 7, the clamp member support part 1412 of the support member 141 comes into contact with the clamp members 131 and moves the clamp members 131 to the upper side 100b1 with respect to the collar member 135.

Further, regions of the collar member 135 which come into contact with the first and second contact parts 1521a, 1522a are located in point symmetry with respect to the spindle rotation axis 124a. Thus, the first and second contact parts 1521a, 1522a come into contact with the regions of the collar member 135 which are located apart from each other in the crossing direction 124b, so that the movement of the collar member 135 can be stabilized.

When the clamp members 131 are moved to the upper side 100b1 with respect to the collar member 135, the first clamp member inclined part 1331 and the second clamp member inclined part 1332 are disengaged from the first collar member inclined part 1361 and the second collar member inclined part 1362, respectively, so that the clamp members 131 are allowed to move in a direction away from the clamp shaft 127 in the crossing direction 124b. Specifically, the force of clamping the clamp shaft 127 with the clamp members 131 is reduced. In this state, the clamp shaft 127 can be removed from the spindle 124 by pulling the clamp shaft 127 out downward. The blade 145 is also released by the release of the clamp shaft 127. Thus, the blade 145 as a tool accessory can be replaced.

In this state, the position of the collar member 135 defines an allowing position for allowing the clamp member 131 to move to a disengaging position, the position of the clamp member 131 defines the disengaging position for disengaging from the clamp shaft 127, and the position of the clamp shaft 127 defines a release position for releasing the blade 145.

Further, as shown in FIG. 8, the switching connection part 153 is arranged in contact with the second inner housing 1102. Therefore, the second inner housing 1102 receives the biasing force of the second coil spring 142 via the lock mechanism 130, the switching part 152 and the switching connection part 153. Specifically, the body housing 101 does not receive the biasing force of the second coil spring 142, so that the body housing 101 can be formed of resin to reduce the weight of the vibration tool 100.

As described above, the blade 145 can be removed by moving the handle part 151 from the blade locking position shown in FIG. 1 to the blade replacement position shown in FIG. 6. On the other hand, when the clamp shaft 127 is inserted into the spindle 124 with the blade 145 mounted thereto and the handle part 151 is moved from the blade replacement position to the blade locking position, the blade 145 can be held between the clamp shaft 127 and the spindle 124.

Second Embodiment

An electric vibration tool 200 according to the second embodiment of the present invention is now described with reference to FIGS. 9 and 10. The vibration tool 200 of the second embodiment is different from the vibration tool 100 of the first embodiment in arrangement of the driving motor 115. As shown in FIG. 9, the driving motor 115 is arranged in the inner housing 110 such that the motor rotation axis direction 117a extends in a direction crossing the spindle rotation axis direction 124a.

With this arrangement of the driving motor 115, as shown in FIG. 10, a region of the driven arm 123 between the arm parts 1231 and the fixed part 1232 is curved. The arm parts 1231 extend from the lower side 100b2 to the upper side 100b1 and are configured to hold the drive bearing 122 from the lower side 100b2. By forming the driven arm 123 in a curved shape, a space surrounded by the driving motor 115, the eccentric shaft 121 and the spindle 124 within the body housing 101 can be effectively utilized.

Further, with the configuration of the driven arm 123 extending from the arm parts 1231 to the fixed part 1232 via the curved region, stress concentration on the fixed part 1232 can be avoided.

The electric vibration tool 200 has the lock mechanism 130 and the lock operation mechanism 150 provided in the above-described electric vibration tool 100. Therefore, the electric vibration tool 200 can perform the same operation and function as the electric vibration tool 100.

In the above-described embodiments, the electric vibration tools 100, 200 are described as a representative example of the power tool, but the power tool is not limited to an electric vibration tool. For example, the present invention may also be applied to a power tool such as a grinder and a circular saw in which the tool accessory rotates. Further, a brushless motor is used as the driving motor 115, but a motor with a brush may also be used.

In view of the nature of the above-described invention, the power tool of the present invention can have the following features. Each of the features can be used separately or in combination with the other, or in combination with the claimed invention.

(Aspect 1)
A support member is disposed between the second end of the spindle and the lock mechanism,
the support member has a coil spring support part which is formed in a lower region and supports a biasing member, and
a coil spring is disposed between the coil spring support part and the lock mechanism.

(Aspect 2)
The support member has a clamp member support part which is formed in an upper region and supports a clamp member when the clamp member is placed in a disengaging position.

(Aspect 3)
A bearing for supporting the spindle also serves as a bearing for supporting the support member.

(Aspect 4)
A lock mechanism assembly is arranged slidably in the spindle rotation axis direction in the inner housing.

(Aspect 5)
In the lock mechanism assembly, the bearing forms a contact element with respect to the inner housing, and the collar member forms a non-contact element with respect to the inner housing.

(Correspondences Between the Features of the Embodiment and the Features of the Invention)

The above-described embodiment is a representative example for embodying the present invention, and the present invention is not limited to the structures that have been described as the representative embodiment. Correspondences between the features of the embodiment and the features of the invention are as follow:

The electric vibration tool 100, 200 is an example embodiment that corresponds to the "power tool" according to the present invention. The blade 145 is an example embodiment that corresponds to the "tool accessory" according to the present invention. The body housing 101 is an example embodiment that corresponds to the "body housing" according to the present invention. The lock operation mechanism 150 is an example embodiment that corresponds to the "operation mechanism" according to the present invention. The lock mechanism 130 is an example embodiment that corresponds to the "lock mechanism" according to the present invention. The spindle 124, the spindle rotation axis direction 124a and the crossing direction 124b are example embodiments that correspond to the "spindle", the "spindle rotation axis direction" and the "crossing direction", respectively, according to the present invention. The driving motor 115, the driven arm 123 and the clamp shaft 127 are example embodiments that correspond to the "motor", the "transmitting member" and the "tool accessory holding member", respectively, according to the present invention. The spindle inner region 1271, the fastening region 1273 and the engagement region 1272 are example embodiments that correspond to the "spindle inner region", the "fastening region" and the "engagement region", respectively, according to the present invention. The lower end 1242 of the spindle 124 and the upper end 1241 of the spindle 124 are example embodiments that correspond to the "first end" and the "second end", respectively, according to the present invention. The second coil spring 142 is an example embodiment that corresponds to the "biasing member" according to the present invention. The coil spring long region 1421 is an example embodiment that corresponds to the "coil spring long region" according to the present invention. The bearing 135a, the clamp member 131 and the collar member 135 are example embodiments that correspond to the "bearing", the "clamp member" and the "collar member", respectively, according to the present invention. The hole 1352, the inner region 1351 and the outer region 1353 are example embodiments that correspond to the "hole", the "inner region" and the "outer region", respectively, according to the present invention. The collar member long region 1354 is an example embodiment that corresponds to the "collar member long region" according to the present invention. The bearing arrangement region 1355 is an example embodiment that corresponds to the "bearing arrangement region" according to the present invention. The sliding contact region 130a is an example embodiment that corresponds to the "sliding contact region" according to the present invention. The first inclined element 130b and the second inclined element 130c are example embodiments that correspond to the "first inclined element" and the "second inclined element", respectively, according to the present invention. The first contact part 1521a and the second contact part 1522a are example embodiments that correspond to the "contact part" according to the present invention.

Further, according to the above-described aspects and the nature of the invention, following features are provided independently and/or as a combination of other features:

Aspect 1

A power tool, which performs a prescribed operation on a workpiece by driving a tool accessory, comprising:
a motor,
a spindle that transmits a driving force of the motor to the tool accessory,
a tool accessory holding member that is configured to be movable in a spindle rotation axis direction between a holding position for holding the tool accessory and a releasing position for releasing the tool accessory, and
a lock mechanism that engages with the tool accessory holding member in the holding position and locks the tool accessory holding member, wherein:
the lock mechanism includes:
a clamp member that is configured to be movable between an engaging position for engaging with the tool accessory holding member to thereby lock the tool accessory holding member in the holding position, and a disengaging position for disengaging from the tool accessory holding member, and
a collar member that supports the clamp member,
the clamp member and the collar member have a sliding contact region to slide in contact with each other,
the sliding contact region has a first inclined element inclined with respect to the spindle rotation axis direction and a second inclined element inclined with respect to the spindle rotation axis direction, and
the first inclined element and the second inclined element are arranged apart from each other in the spindle rotation axis direction.

Aspect 2

The power tool as defined in Aspect 1, wherein:
the first inclined element has a first clamp member inclined part formed on the clamp member and a first collar member inclined part formed on the collar member,
the second inclined element has a second clamp member inclined part formed on the clamp member and a second collar member inclined part formed on the collar member,
the clamp member has a clamp member inclination connecting part which connects the first clamp member inclined part and the second clamp member inclined part and extends in the spindle rotation axis direction, and
the collar member has a collar member inclination connecting part which connects the first collar member inclined part and the second collar member inclined part and extends in the spindle rotation axis direction.

Aspect 3

The power tool as defined in Aspects 1 or 2, wherein extending directions of the first and second inclined elements have respective extending components parallel to each other.

Aspect 4

The power tool as defined in any one of aspects 1 to 3, wherein:
the collar member has an inner region having a hole in which the clamp member is disposed and through which the engagement region of the tool accessory holding member is inserted, and an outer region which is formed outside of the inner region in a crossing direction crossing the spindle rotation axis direction, and
the outer region has a bearing arrangement region in which a bearing for rotatably supporting the collar member is disposed.

Aspect 5

The power tool as defined in aspect 4, wherein the clamp member, the collar member and the bearing are arranged along the crossing direction.

Aspect 6

The power tool as defined in aspect 4 or 5, wherein:
the lock mechanism comprises a lock mechanism assembly having the collar member, the clamp member, the bearing, a lid member which covers at least part of the inner region of the collar member, and a biasing member disposed between the lid member and the clamp member, and
the lock mechanism assembly is mounted to the body housing.

Aspect 7

The power tool as defined in aspect 6, wherein:
the spindle has a hollow shape and has a first end and a second end in the spindle rotation axis direction,
the tool accessory holding member has a spindle inner region which is disposed inside the spindle, a tool accessory fastening region which protrudes from the first end and can be fastened to the tool accessory, and an engagement region which protrudes from the second end and can be engaged with the clamp member,
the power tool further has a body housing that forms at least part of an outer shell of the power tool, and
the lock mechanism assembly is disposed between the second end and a wall of the body housing in the spindle rotation axis direction.

Aspect 8

A power tool, which performs a prescribed operation on a workpiece by driving a tool accessory, comprising:
a motor,
a spindle that transmits a driving force of the motor to the tool accessory,
a tool accessory holding member that is configured to be movable in a spindle rotation axis direction between a holding position for holding the tool accessory and a releasing position for releasing the tool accessory, and
a lock mechanism that engages with the tool accessory holding member in the holding position and locks the tool accessory holding member, wherein:
the lock mechanism includes:
a clamp member that is configured to be movable between an engaging position for engaging with the tool accessory holding member to thereby lock the tool accessory holding member in the holding position, and a disengaging position for disengaging from the tool accessory holding member, and
a collar member which supports the clamp member, and
the collar member has an inner region having a hole in which the clamp member is disposed and through which the engagement region of the tool accessory holding member is inserted, and an outer region which is formed outside of the inner region in a crossing direction crossing the spindle rotation axis direction, and
the outer region has a bearing arrangement region in which a bearing for rotatably supporting the collar member is disposed.

According to the above-described aspects, the power tool may have a motor, a spindle, a tool accessory holding member and a lock mechanism. The spindle is configured to transmit a driving force of the motor to the tool accessory. The tool accessory holding member is configured to be movable in the spindle rotation axis direction between a holding position for holding the tool accessory and a releasing position for releasing the tool accessory. The lock mechanism is configured to engage with the tool accessory holding member in the holding position and lock the tool accessory holding member.

Further, the lock mechanism includes a clamp member that is configured to be movable between an engaging position for engaging with the tool accessory holding member to thereby lock the tool accessory holding member in the holding position, and a disengaging position for disengaging from the tool accessory holding member, and a collar member that supports the clamp member. The clamp member and the collar member have a sliding contact region to slide in contact with each other, and the sliding contact region has a first inclined element inclined with respect to the spindle rotation axis and a second inclined element inclined with respect to the spindle rotation axis. The first inclined element and the second inclined element are arranged apart from each other in the spindle rotation axis direction.

With this structure, the clamp member is configured to be allowed to move between the engaging position and the disengaging position by sliding contact of the clamp member and the collar member with each other. Typically, each of the first and second inclined elements may have an inclination inclined downward toward the spindle rotation axis. When the clamp member moves downward with respect to the collar member, the clamp member moves along the inclinations of the first and second inclined elements in a direction (inward) toward the spindle rotation axis in the crossing direction, so that the clamp member can be placed in the engaging position. On the other hand, when the clamp member moves upward with respect to the collar member, the clamp member moves along the inclinations of the first and second inclined elements in a direction away from the spindle rotation axis (outward) in the crossing direction, so that the clamp member can be placed in the disengaging position.

For the purpose of this movement, the inclination of the sliding contact region needs to have a lower end, an upper end and a continuous region extending between the lower end and the upper end in order to secure the relative movement of the clamp member and the collar member for a prescribed distance. In the case of the sliding contact region having a single inclination, one lower end, one upper end and one continuous region is provided. In the case of the sliding contact region having the first inclined element and the second inclined element, each of the first inclined element and the second inclined element can have the lower end, the upper end and the continuous region. Further, the lower end of the first inclined element can be arranged adjacent to the upper end of the second inclined element in the crossing direction. Thus, the distance between the upper end of the first inclined element and the lower end of the second inclined element in the crossing direction can be made shorter than the distance between the upper end and the lower end in the crossing direction in the sliding contact region having a single inclination.

Thus, in the power tool according to this aspect, the lock mechanism can be shortened in the crossing direction.

The sliding contact region (the first inclined element or the second inclined element) may be formed in a straight or curved shape, a combination of a plurality of continuously formed straight shapes or a combination of a plurality of continuously formed curved shapes. A representative example of the curved shape is a circular arc shape.

The definition of inclination of the sliding contact region with respect to the spindle rotation axis is that an extension line of the sliding contact region crosses the spindle rotation axis at a prescribed angle. As for the extension line of the sliding contact region, it is an extension line having a straight shape in the case of the sliding contact region having the straight shape, and it is a normal line having a circular arc shape in the case of the sliding contact region having the circular arc shape. Further, in the case of the sliding contact region having a combination of a plurality of continuously formed straight or curved shapes, a straight extension line connecting the upper end and the lower end of the sliding contact region can be defined as the extension line of the sliding contact region.

A prescribed angle of the first inclined element with respect to the spindle rotation axis and a prescribed angle of the second inclined element with respect to the spindle rotation axis may be the same or different from each other.

In the power tool of the present invention, typically, the spindle is rotationally driven by the motor to reciprocatingly drive the tool accessory within a prescribed angular range around the spindle rotation axis. Specifically, the tool accessory is driven to reciprocatingly rotate on the spindle rotation axis. The tool accessory suitably includes plural kinds of tools such as a cutting tool for cutting a workpiece and a grinding tool for grinding a workpiece. Thus, the tool accessory performs a cutting or grinding operation by reciprocating drive (vibration) of the tool accessory within a prescribed angular range. This power tool is also referred to as a vibration tool.

According to a further aspect of the power tool of the present invention, the first inclined element may have a first clamp member inclined part formed on the clamp member and a first collar member inclined part formed on the collar member. The second inclined element may have a second clamp member inclined part formed on the clamp member and a second collar member inclined part formed on the collar member. In this structure, the clamp member may have a clamp member inclination connecting part which connects the first clamp member inclined part and the second clamp member inclined part and extends in the spindle rotation axis direction, and the collar member may have a collar member inclination connecting part which connects the first collar member inclined part and the second collar member inclined part and extends in the spindle rotation axis direction.

In the power tool according to this invention, by providing the clamp member inclination connecting part and the collar member inclination connecting part, the first inclined element and the second inclined element can be arranged adjacent to each other in a direction (crossing direction) crossing the spindle rotation axis direction. Thus, the lock mechanism can be shortened in the crossing direction, so that the power tool can be reduced in size.

"Extending in the spindle rotation axis direction" typically represents extending in parallel to the spindle rotation axis direction. Having an extending component in the spindle rotation axis direction, even if not parallel to the spindle rotation axis direction, corresponds to "extending in the spindle rotation axis direction".

According to a further aspect of the power tool of the present invention, extending directions of the first and second inclined elements may have respective extending components parallel to each other.

With this structure, the clamp member can be smoothly slid with respect to the collar member. Thus, the clamp member can be efficiently moved between the engaging position and the disengaging position.

According to a further aspect of the power tool of the present invention, the collar member may have an inner region having a hole in which the clamp member is disposed and through which the engagement region of the tool accessory holding member is inserted, and an outer region which is formed outside of the inner region in a crossing direction crossing the spindle rotation axis direction. In this structure, the outer region may be provided with a bearing arrangement region in which a bearing for rotatably supporting the collar member is disposed.

When the collar member is in the engaging position and the spindle is rotated by the motor, the collar member is rotated as the tool accessory holding member is rotated. The bearing is provided to support rotation of the collar member with stability. In the power tool according to this aspect, by the arrangement of the bearing in the outer region of the collar member, the lock mechanism can be formed in a compact structure to contribute to size reduction of the power tool.

According to a further aspect of the power tool of the present invention, the clamp member, the collar member and the bearing may be arranged along the crossing direction.

With this structure, by arranging the components of the lock mechanism along the crossing direction, the lock mechanism can be shortened in the spindle rotation axis direction to contribute to size reduction of the power tool.

According to a further aspect of the power tool of the present invention, the lock mechanism may form a lock mechanism assembly having the collar member, the clamp member, the bearing, a lid member which covers at least part of the inner region of the collar member, and a biasing member disposed between the lid member and the clamp member. In this structure, the lock mechanism assembly may be mounted to the body housing.

In the power tool according to this invention, the lock mechanism consisting of a plurality of parts can be formed as the lock mechanism assembly and mounted to the body housing, so that labor of the assembling operation of the power tool can be saved.

According to a further aspect of the power tool of the present invention, the spindle may have a hollow shape and have a first end and a second end in the spindle rotation axis direction. The tool accessory holding member may have a spindle inner region which is disposed inside the spindle, a tool accessory fastening region which protrudes from the first end of the spindle and can be fastened to the tool accessory, and an engagement region which protrudes from the second end of the spindle and can be engaged with the clamp member. The power tool may further have a body housing that forms at least part of an outer shell of the power tool.

In this structure, the lock mechanism assembly may be disposed between the second end of the spindle and a wall of the body housing in the spindle rotation axis direction.

In the power tool according to this aspect, the lock mechanism assembly and the spindle are arranged apart from each other. Thus, the spindle can be independently designed without depending on the design of the lock mechanism assembly, so that the spindle can be reduced in size.

Further, with the arrangement of the lock mechanism assembly apart from the spindle, the lock mechanism assembly can be readily mounted. Further, only the lock mechanism assembly can be removed for repair from the body housing, so that the efficiency of repairing work can be enhanced.

In order to solve the above-described problem, according to the present invention, a power tool is provided which performs a prescribed operation on a workpiece by driving a tool accessory. The power tool has a motor, a spindle, a tool accessory holding member and a lock mechanism.

The spindle is configured to transmit a driving force of the motor to the tool accessory. The tool accessory holding member is configured to be movable in the spindle rotation axis direction between a holding position for holding the tool accessory and a releasing position for releasing the tool accessory. The lock mechanism is configured to engage with the tool accessory holding member in the holding position and lock the tool accessory holding member.

Further, the lock mechanism includes a clamp member that is configured to be movable between an engaging position for engaging with the tool accessory holding member to thereby lock the tool accessory holding member in the holding position, and a disengaging position for disengaging from the tool accessory holding member, and a collar member that supports the clamp member.

The collar member may have an inner region having a hole in which the clamp member is disposed and through which the engagement region of the tool accessory holding member is inserted, and an outer region which is formed on outside of the inner region in a crossing direction crossing the spindle rotation axis direction. In this structure, the outer region may be provided with a bearing arrangement region in which a bearing for rotatably supporting the collar member is disposed.

When the collar member is in the engaging position and the spindle is rotated by the motor, the collar member is rotated as the tool accessory holding member is rotated. The bearing is provided to support rotation of the collar member with stability. In the power tool according to this invention, by the arrangement of the bearing in the outer region of the collar member, the lock mechanism can be formed in a compact structure to contribute to size reduction of the power tool.

DESCRIPTION OF NUMERALS 100, 200 electric vibration tool (power tool)
100$a$ longitudinal direction
100$a$1 front side
100$a$2 rear side
100$b$ height direction
100$b$1 upper side
100$b$2 lower side
100$c$ width direction
101 body housing
1011 front region
1012 intermediate region
1013 rear region
107 grip part
108 slide switch
109 battery mounting part
110 inner housing
1101 first inner housing
1102 second inner housing
1103 connecting member
1104 space region
111 elastic member
115 driving motor (motor)
117 output shaft 117a motor rotation axis direction
120 driving mechanism
121 eccentric shaft
1211 eccentric part
121a bearing
121b bearing
122 drive bearing
123 driven arm (transmitting member)
1231 arm part
1232 fixed part
124 spindle
1241 upper end
1242 lower end
124a spindle rotation axis direction
124b crossing direction
124c bearing
124d bearing
126 tool holding part
127 clamp shaft (tool accessory holding member)
1271 spindle inner region
1272 engagement region
1273 fastening region (tool accessory fastening region)
128 clamp head
129 clamp member engagement groove
130 lock mechanism
1301 lock mechanism assembly
130a sliding contact region
130b first inclined element
130c second inclined element
131 clamp member
132 ridge part
1331 first clamp member inclined part
1332 second clamp member inclined part
1333 clamp member inclination connecting part
1333a first extending region
1333b second extending region
134 first coil spring
135 collar member
1351 inner region
1352 hole
1353 outer region
1354 collar member long region
1355 bearing arrangement region
135a bearing
1361 first collar member inclined part
1362 second collar member inclined part
1363 collar member inclination connecting part
137 lid member
140 biasing mechanism
141 support member
1411 coil spring support part
1412 clamp member support part
142 second coil spring (biasing member)
1421 coil spring long region
145 blade (tool accessory)
150 lock operation mechanism (operation mechanism)
151 handle part
1511 grip
1512 arm
1513 pivot shaft (handle part pivot shaft)
152 switching part
1521 first cam
1521a first contact part
1521b first notch part
1522 second cam
1522a second contact part
1522b second notch part
153 switching connection part
1531 eccentric shaft
180 controller
190 battery

I claim:

1. A power tool configured to perform an operation on a workpiece by driving a tool accessory, the power tool comprising:
a motor;
a spindle configured to transmit a driving force of the motor to the tool accessory;
a tool accessory holding member configured to move in an axial direction of the spindle between a holding position for holding the tool accessory and a releasing position for releasing the tool accessory; and
a lock mechanism configured to engage with the tool accessory holding member in the holding position and lock the tool accessory holding member,
wherein:
the lock mechanism includes:
a collar member; and
a clamp member held by the collar member to be movable between an engaging position and a disengaging position, the clamp member being engageable with the tool accessory holding member in the engaging position and being disengageable with the tool accessory holding member in the disengaging position,
the collar member includes a first inclined part and a second inclined part spaced apart from each other in the axial direction of the spindle and each being inclined relative to an axis of the spindle,
the clamp member includes a third inclined part and a fourth inclined part spaced apart from each other in the axial direction of the spindle, the third inclined part and the fourth inclined part being configured to slide in contact with the first inclined part and the second inclined part, respectively,
the first inclined part extends at least partly in parallel with the second inclined part, and
the third inclined part extends at least partly in parallel with the fourth inclined part.

2. The power tool according to claim 1, wherein the clamp member is configured to move between the engaging position and the disengaging position relative to the collar member by way of sliding contacts of the first and third inclined parts and of the second and fourth inclined parts.

3. The power tool according to claim 1, wherein:
the collar member includes a first connecting part extending in the axial direction of the spindle and connecting the first inclined part with the second collar member inclined part, and
the clamp member includes a second connecting part extending in the axial direction of the spindle and connecting the third inclined part with the fourth clamp inclined part.

4. The power tool according to claim 3, wherein:
the first inclined part and the second inclined part are disposed step by step in the axial direction, and
the third inclined part and the fourth inclined part are disposed step by step in the axial direction.

5. The power tool according to claim 1, further comprising:
a body housing,
wherein:
the collar member is rotatably supported by the body housing via a bearing, and the collar member includes a hole in which the clamp member is disposed.

6. The power tool according to claim 5, wherein the clamp member, the collar member and the bearing are aligned in a direction crossing the axis of the spindle.

7. The power tool according to claim 5, wherein:
the lock mechanism is formed as an assembly comprising the clamp member, the collar member, the bearing, a lid member at least partly covering the collar member, and a biasing member disposed between the clamp member and the lid member, and
the lock mechanism assembly is mounted to the body housing.

8. The power tool according to claim 5, wherein the bearing is disposed at a circumferential outer surface of the collar member.

9. The power tool according to claim 1, wherein:
the spindle is formed as a hollow cylindrical body having a first axial end and a second axial end, and
the accessory holding member is configured to be inserted through the spindle and has a first region and a second region, the first region protruding from the first axial end of the spindle to be fastened to the tool accessory and the second region protruding from the second axial end of the spindle to be engaged with the clamp member.

10. The power tool according to claim 1, wherein:
the collar member is configured to move between a maintaining position and an allowing position, the collar member in the maintaining position holding the clamp member in the engaging position and the collar member in the allowing position allowing the clamp member to move from the engaging position to the disengaging position, and
the power tool further comprises an operation mechanism configured to move the collar member between the maintaining position and the allowing position by means of an user's manual manipulation.

11. The power tool according to claim 1, wherein:
the first inclined part and the second inclined part are disposed in different positions in a direction crossing the axis of the spindle, and
the third inclined part and the fourth inclined part are disposed in different positions in the direction crossing the axis of the spindle.

12. The power tool according to claim 11, wherein:
the spindle has a first axial end to which the tool accessory is attachable,
the first inclined part is disposed further from the first axial end of the spindle than the second inclined part in the axial direction of the spindle, and disposed radially further outward from the axis of the spindle than the second inclined part, and
the third inclined part is disposed further from the first axial end of the spindle than the fourth inclined part in the axial direction of the spindle, and disposed radially further outward from the axis of the spindle than the fourth inclined part.

13. A power tool configured to perform an operation on a workpiece by driving a tool accessory, the power tool comprising:
a motor;
a spindle configured to transmit a driving force of the motor to the tool accessory;
a tool accessory holding member configured to move in an axial direction of the spindle between a holding position for holding the tool accessory and a releasing position for releasing the tool accessory;
a lock mechanism configured to engage with the tool accessory holding member in the holding position and lock the tool accessory holding member; and
a body housing;
wherein:
the lock mechanism includes:
a collar member; and
a clamp member held by the collar member to be movable between an engaging position and a disengaging position, the clamp member being engageable with the tool accessory holding member in the engaging position and being disengageable with the tool accessory holding member in the disengaging position;
the collar member includes a first inclined part and a second inclined part spaced apart from each other in the axial direction of the spindle and each being inclined relative to an axis of the spindle;
the clamp member includes a third inclined part and a fourth inclined part spaced apart from each other in the axial direction of the spindle, the third inclined part and the fourth inclined part being configured to slide in contact with the first inclined part and the second inclined part, respectively;
the collar member is rotatably supported by the body housing via a bearing;
the collar member includes a hole in which the clamp member is disposed; and
the bearing is disposed at a circumferential outer surface of the collar member.

14. The power tool according to claim 13, wherein the clamp member, the collar member and the bearing are aligned in a direction crossing the axis of the spindle.

15. The power tool according to claim 13, wherein:
the lock mechanism is formed as an assembly comprising the clamp member, the collar member, the bearing, a lid member at least partly covering the collar member; and a biasing member disposed between the clamp member and the lid member; and
the lock mechanism assembly is mounted to the body housing.

16. The power tool according to claim 13, wherein:
the first inclined part and the second inclined part are disposed in different positions in a direction crossing the axis of the spindle; and
the third inclined part and the fourth inclined part are disposed in different positions in the direction crossing the axis of the spindle.

17. The power tool according to claim 16, wherein:
the spindle has a first axial end to which the tool accessory is attachable;
the first inclined part is disposed further from the first axial end of the spindle than the second inclined part in the axial direction of the spindle, and disposed radially further outward from the axis of the spindle than the second inclined part; and
the third inclined part is disposed further from the first axial end of the spindle than the fourth inclined part in the axial direction of the spindle, and disposed radially further outward from the axis of the spindle than the fourth inclined part.

18. A power tool configured to perform an operation on a workpiece by driving a tool accessory, the power tool comprising:
a motor;

a spindle configured to transmit a driving force of the motor to the tool accessory;

a tool accessory holding member configured to move in an axial direction of the spindle between a holding position for holding the tool accessory and a releasing position for releasing the tool accessory; and a lock mechanism configured to engage with the tool accessory holding member in the holding position and lock the tool accessory holding member;

wherein:

the lock mechanism includes:

a collar member; and a clamp member held by the collar member to be movable between an engaging position and a disengaging position, the clamp member being engageable with the tool accessory holding member in the engaging position and being disengageable with the tool accessory holding member in the disengaging position;

the collar member includes a first inclined part and a second inclined part spaced apart from each other in the axial direction of the spindle and each being inclined relative to an axis of the spindle;

the clamp member includes a third inclined part and a fourth inclined part spaced apart from each other in the axial direction of the spindle, the third inclined part and the fourth inclined part being configured to slide in contact with the first inclined part and the second inclined part, respectively;

the first inclined part and the second inclined part are disposed in different positions in a direction crossing the axis of the spindle;

the third inclined part and the fourth inclined part are disposed in different positions in the direction crossing the axis of the spindle;

the spindle has a first axial end to which the tool accessory is attachable;

the first inclined part is disposed further from the first axial end of the spindle than the second inclined part in the axial direction of the spindle, and disposed radially further outward from the axis of the spindle than the second inclined part; and the third inclined part is disposed further from the first axial end of the spindle than the fourth inclined part in the axial direction of the spindle, and disposed radially further outward from the axis of the spindle than the fourth inclined part.

19. The power tool according to claim 18, wherein the clamp member is configured to move between the engaging position and the disengaging position relative to the collar member by way of sliding contacts of the first and third inclined parts of the second and fourth inclined parts.

20. The power tool according to claim 18, wherein:

the collar member includes a first connecting part extending in the axial direction of the spindle and connecting the first inclined part with the second collar member inclined part; and the clamp member includes a second connecting part extending in the axial direction of the spindle and connecting the third inclined part with the fourth clamp inclined part.

* * * * *